US012615170B2

(12) United States Patent
Peng et al.

(10) Patent No.: US 12,615,170 B2
(45) Date of Patent: Apr. 28, 2026

(54) METHOD AND APPARATUS FOR CONTROLLING USER EQUIPMENT TO ACCESS NETWORK, AND DEVICE

(71) Applicant: Huawei Technologies Co., Ltd., Shenzhen (CN)

(72) Inventors: Tao Peng, Nanjing (CN); Zhouyi Yu, Beijing (CN); Rongrong Hua, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 272 days.

(21) Appl. No.: 18/478,571

(22) Filed: Sep. 29, 2023

(65) Prior Publication Data

US 2024/0031196 A1     Jan. 25, 2024

Related U.S. Application Data

(63) Continuation of application No. PCT/CN2022/082990, filed on Mar. 25, 2022.

(30) Foreign Application Priority Data

| Apr. 8, 2021 | (CN) | ......................... | 202110378190.0 |
| Jun. 30, 2021 | (CN) | ......................... | 202110745012.7 |

(51) Int. Cl.
*H04L 12/28* (2006.01)
*H04L 12/66* (2006.01)
(Continued)

(52) U.S. Cl.
CPC ...... *H04L 12/2869* (2013.01); *H04L 12/2858* (2013.01); *H04L 12/2876* (2013.01);
(Continued)

(58) Field of Classification Search
CPC ............. H04L 12/2869; H04L 12/2858; H04L 12/2876; H04L 12/66; H04L 41/0897;
(Continued)

(56) References Cited

U.S. PATENT DOCUMENTS

| 2019/0141618 A1* | 5/2019 | Yin | ........................ | H04W 8/082 |
| 2020/0260523 A1* | 8/2020 | Sun | ........................ | H04W 76/40 |

(Continued)

FOREIGN PATENT DOCUMENTS

| CN | 109729125 | * | 5/2019 | .............. | H04W 4/08 |
| CN | 111182034 | * | 5/2020 | ......... | H04L 67/1008 |
| EP | 3364708 A1 | | 8/2018 | | |

OTHER PUBLICATIONS

Sun, "Session establishment method, device and system", CN 109729125 A, May 7, 2019, 45 Pages. (Year: 2019).*

(Continued)

*Primary Examiner* — Brian J. Gillis
*Assistant Examiner* — Chhian (Amy) Ling
(74) *Attorney, Agent, or Firm* — Slater Matsil, LLP

(57) ABSTRACT

This application discloses a method for controlling user equipment to access a network. After receiving a request packet sent by a gateway control plane device, a control device obtains, by parsing the request packet, a home identifier corresponding to first user equipment. The control device determines, based on the home identifier, a corresponding first target gateway user plane device when the first user equipment goes online, so that a plurality of user equipments corresponding to a same home identifier all go online through the first target gateway user plane device.

21 Claims, 11 Drawing Sheets

(51) Int. Cl.

| | |
|---|---|
| *H04L 41/0897* | (2022.01) |
| *H04L 41/342* | (2022.01) |
| *H04L 41/5019* | (2022.01) |
| *H04L 67/1004* | (2022.01) |
| *H04L 69/22* | (2022.01) |
| *H04W 88/16* | (2009.01) |

(52) U.S. Cl.
CPC .......... *H04L 12/66* (2013.01); *H04L 41/0897* (2022.05); *H04L 41/342* (2022.05); *H04L 41/5019* (2013.01); *H04L 67/1004* (2013.01); *H04L 69/22* (2013.01); *H04W 88/16* (2013.01)

(58) Field of Classification Search
CPC ............... H04L 41/342; H04L 41/5019; H04L 67/1004; H04L 69/22; H04L 41/0895; H04L 41/40; H04L 43/0876; H04L 43/02; H04L 43/20; H04W 88/16
See application file for complete search history.

(56) References Cited

U.S. PATENT DOCUMENTS

| | | | | |
|---|---|---|---|---|
| 2021/0076257 A1* | 3/2021 | Pocha | .................. | H04W 40/22 |
| 2024/0259857 A1* | 8/2024 | Zhu | ...................... | H04W 76/11 |

OTHER PUBLICATIONS

Xiong et al., "Load balancing method, device and equipment for user online", CN 111182034 A, May 19, 2020, 23 Pages. (Year: 2020).*
Nokia, "Selection of user plane functional entity deployed at the edge local network", 3GPP, S2-161554, SA WG2 Meeting #114, Apr. 11-15, 2016, Sophia Antipolis, France (revision of S2-16xxxx)., 2 Pages (Year: 2016).*
Broadband Forum: "TR-459 Control and User Plane Separation for a disaggregated BNG", 3GPP Draft; C4-203064, 3rd Generation Partnership Project (3GPP), Mobile Competence Centre; 650, Route Des Lucioles; F-06921 Sophia-Antipolis Cedex; France, May 14, 2020 (May 14, 2020), XP052331094, total 103 pages.

* cited by examiner

1100

METHOD AND APPARATUS FOR CONTROLLING USER EQUIPMENT TO ACCESS NETWORK, AND DEVICE

CROSS-REFERENCE TO RELATED APPLICATIONS

This application is a continuation of International Application No. PCT/CN2022/082990, filed on Mar. 25, 2022, which claims priority to Chinese Patent Application No. 202110378190.0, filed on Apr. 8, 2021 and Chinese Patent Application No. 202110745012.7, filed on Jun. 30, 2021. All of the aforementioned patent applications are hereby incorporated by reference in their entireties.

TECHNICAL FIELD

This application relates to the field of communication technologies, and in particular, to a method and apparatus for controlling user equipment to access a network, and a device.

BACKGROUND

With development of software-defined networking (SDN) technologies and network function virtualization (NFV) technologies, a metropolitan area network evolves towards a data center-centric network architecture. In addition, a conventional network element device also evolves from a professional direction to a universal direction. For example, a broadband network gateway (BNG) serving as a conventional broadband access gateway device is very important in user broadband access services and scenarios. Main requirements of the BNG for user access are user authentication, access control, traffic scheduling, and the like. With emergence of various internet services, requirements for a quantity of user sessions supported by the BNG and user access bandwidth are increasingly high, and especially requirements of the BNG for providing service openness and programmability capabilities externally are increasingly high. Based on these factors, the BNG implements the foregoing two decouplings based on an SDN/NFV architecture. After forwarding and control of the BNG are decoupled, a control plane (CP) may manage a plurality of user planes (UPs) to perform user, traffic, and resource scheduling between the plurality of forwarding planes. Compared with a stand-alone device, the BGN has better utilization and reliability.

On an existing network, the CP may manage many UPs that are managed by a user on the CP in a unified manner. Therefore, flexible user scheduling between the UPs may be performed based on a quantity of user sessions, a traffic load status, and the like. Currently, when UPs are allocated to different user equipments, different users are allocated to a plurality of UPs mainly based on load of the UPs and service level agreements (Service Level Agreements, SLAs) of the user equipments. However, in some application scenarios, a plurality of users in a same home need to be managed in a unified manner, for example, unified rate limiting and accounting. If different users in a same home are allocated to different UPs, home-based management such as rate limiting cannot be implemented.

SUMMARY

Embodiments of this application provide a method and apparatus for controlling user equipment to access a network, and a device, to allocate different user equipments belonging to a same home to a same user plane device in a unified manner, and perform unified management.

According to a first aspect of this application, a method for controlling user equipment to access a network is provided. The method includes: A control device receives a first packet sent by a gateway control plane device, where the first packet includes a home identifier corresponding to first user equipment. The control device determines a first target gateway user plane device based on the home identifier. The control device sends a second packet to the gateway control plane device, where the second packet includes an identifier of the first target gateway user plane device.

In this implementation, after receiving a request packet sent by the first user equipment, the gateway control plane device obtains the home identifier corresponding to the first user equipment based on user information of the first user equipment, and sends the first packet including the home identifier to the control device. The control device obtains the home identifier by parsing the first packet, and determines, based on the home identifier, a corresponding gateway user plane device when the first user equipment goes online, that is, the first target gateway user plane device. In other words, when allocating the gateway user plane device to the first user equipment, the control device performs allocation based on the home identifier, to ensure that a plurality of user equipments corresponding to the home identifier are allocated to a same gateway user plane device. In this way, different user equipments of a same home can go online through the same gateway user plane device, thereby facilitating home-based unified management.

In an example, that the control device determines a first target gateway user plane device based on the home identifier includes: The control device determines, based on the home identifier and a correspondence between the home identifier and a gateway user plane device, that the gateway user plane device corresponding to the home identifier exists. The control device determines the gateway user plane device corresponding to the home identifier as the first target gateway user plane device.

In another example, the method further includes: If the control device determines, based on the home identifier and the correspondence between the home identifier and the gateway user plane device, that the gateway user plane device corresponding to the home identifier does not exist, the control device determines a first target user plane device based on service level agreement SLA information of the first user equipment and/or load of each gateway user plane device.

In a possible implementation, the method further includes: The control device stores a correspondence between the home identifier and the first target user plane device.

In a possible implementation, the method further includes: The control device sends configuration information to a steering device, where the configuration information includes the identifier of the first target gateway user plane device, and the configuration information indicates the steering device to configure user information of the first user equipment on an interface corresponding to the first target gateway user plane device.

In a possible implementation, when the first user equipment needs to be migrated, the method further includes: The control device determines, based on the home identifier, one or more second user equipments that need to be migrated, where the one or more second user equipments belong to a home indicated by the home identifier. The control device determines a second target user plane device. The control device sends control information to the gateway control plane device, where the control information includes an identifier of the first user equipment, identifiers of the one or more second user equipments, and an identifier of the second target user plane device, and the control information indicates the gateway control plane device to send routing entries of the first user equipment and the one or more second user equipments to the second target user plane device.

In a possible implementation, the control device may be a gateway user plane steering function device.

According to a second aspect of this application, a method for controlling user equipment to access a network is provided. The method includes: A gateway control plane device receives a request packet sent by a first gateway user plane device, where the request packet is used to request first user equipment to access a network, and the request packet includes user information of the first user equipment. The gateway control plane device obtains, based on the user information, a home identifier corresponding to the first user equipment. The gateway control plane device sends a first packet including the home identifier to a control device.

In a possible implementation, that the gateway control plane device obtains, based on the user information, a home identifier corresponding to the first user equipment includes: The gateway control plane device obtains, based on location information in the user information, the home identifier corresponding to the first user equipment, where the location information is added by a steering device to the request packet.

In a possible implementation, the location information includes an identifier of the steering device and an interface identifier, and the interface identifier corresponds to the first gateway user plane device.

In a possible implementation, that the gateway control plane device obtains, based on the user information, a home identifier corresponding to the first user equipment includes:

The gateway control plane device allocates the home identifier to the first user equipment based on the user information.

In a possible implementation, that the gateway control plane device obtains, based on the user information, a home identifier corresponding to the first user equipment includes:

The gateway control plane device sends a third packet including the user information to an authentication server.

The gateway control plane device receives a fourth packet that includes the home identifier and that is sent by the authentication server.

According to a third aspect of this application, a method for controlling user equipment to access a network is provided. The method includes: A gateway control plane device receives a request packet sent by a first gateway user plane device, where the request packet is used to request first user equipment to access a network, and the request packet includes location information. The gateway control plane device determines a home identifier based on the location information. The gateway control plane device determines a first target gateway user plane device based on the home identifier. The gateway control plane device sends a fifth packet to the first target gateway user plane device, where the fifth packet includes the first target gateway user plane device.

In a possible implementation, that the gateway control plane device determines a first target gateway user plane device based on the home identifier includes: The gateway control plane device determines, based on the home identifier and a correspondence between the home identifier and a gateway user plane device, that the gateway user plane device corresponding to the home identifier exists. The gateway control plane device determines the gateway user plane device corresponding to the home identifier as the first target gateway user plane device.

In a possible implementation, the method further includes: If the gateway control plane device determines, based on the home identifier and the correspondence between the home identifier and the gateway user plane device, that the gateway user plane device corresponding to the home identifier does not exist, the gateway control plane device determines a first target user plane device based on service level agreement SLA information of the first user equipment and/or load of each gateway user plane device.

According to a fourth aspect of this application, an apparatus for controlling user equipment to access a network is provided. The apparatus includes: a receiving unit, configured to receive a first packet sent by a gateway control plane device, where the first packet includes a home identifier corresponding to first user equipment; a determining unit, configured to determine a first target gateway user plane device based on the home identifier; and a sending unit, configured to send a second packet to the gateway control plane device, where the second packet includes an identifier of the first target gateway user plane device.

In a possible implementation, the determining unit is specifically configured to determine, based on the home identifier and a correspondence between the home identifier and a gateway user plane device, that the gateway user plane device corresponding to the home identifier exists; and determine the gateway user plane device corresponding to the home identifier as the first target gateway user plane device.

In a possible implementation, the determining unit is further configured to: if determining, based on the home identifier and the correspondence between the home identifier and the gateway user plane device, that the gateway user plane device corresponding to the home identifier does not exist, determine a first target user plane device based on service level agreement SLA information of the first user equipment and/or load of each gateway user plane device.

In a possible implementation, the apparatus further includes a storage unit.

The storage unit is configured to store a correspondence between the home identifier and the first target user plane device.

In a possible implementation, the sending unit is further configured to send configuration information to a steering device, where the configuration information includes the identifier of the first target gateway user plane device, and the configuration information indicates the steering device to configure user information of the first user equipment on an interface corresponding to the first target gateway user plane device.

In a possible implementation, when the first user equipment needs to be migrated, the determining unit is further configured to determine, based on the home identifier, one or more second user equipments that need to be migrated, where the one or more second user equipments belong to a home indicated by the home identifier; the determining unit is further configured to determine a second target user plane device; and the sending unit is further configured to send control information to the gateway control plane device, where the control information includes an identifier of the first user equipment, identifiers of the one or more second user equipments, and an identifier of the second target user plane device, and the control information indicates the gateway control plane device to send routing entries of the first user equipment and the one or more second user equipments to the second target user plane device.

In a possible implementation, the apparatus is a gateway user plane steering function device.

According to a fifth aspect of this application, an apparatus for controlling user equipment to access a network is provided. The apparatus includes: a receiving unit, configured to receive a request packet sent by a first gateway user plane device, where the request packet is used to request first user equipment to access a network, and the request packet includes user information of the first user equipment; an obtaining unit, configured to obtain, based on the user information, a home identifier corresponding to the first user equipment; and a sending unit, configured to send a first packet including the home identifier to a control device.

In a possible implementation, the obtaining unit is specifically configured to obtain, based on location information in the user information, the home identifier corresponding to the first user equipment, where the location information is added by a steering device to the request packet.

In a possible implementation, the location information includes an identifier of the steering device and an interface identifier, and the interface identifier corresponds to the first gateway user plane device.

In a possible implementation, the obtaining unit is specifically configured to allocate the home identifier to the first user equipment based on the user information.

In a possible implementation, the obtaining unit is specifically configured to send a third packet including the user information to an authentication server; and receive a fourth packet that includes the home identifier and that is sent by the authentication server.

According to a sixth aspect of this application, an apparatus for controlling user equipment to access a network is provided. The apparatus includes: a receiving unit, configured to receive a request packet sent by a first gateway user plane device, where the request packet is used to request first user equipment to access a network, and the request packet includes location information; a determining unit, configured to determine a home identifier based on the location information, where the determining unit is further configured to determine a first target gateway user plane device based on the home identifier; and a sending unit, configured to send a fifth packet to the first target gateway user plane device, where the fifth packet includes the first target gateway user plane device.

In a possible implementation, the determining unit is specifically configured to determine, based on the home identifier and a correspondence between the home identifier and a gateway user plane device, that the gateway user plane device corresponding to the home identifier exists, where the correspondence includes a correspondence between the gateway user plane device and the home identifier; and determine the gateway user plane device corresponding to the home identifier as the first target gateway user plane device.

In a possible implementation, the determining unit is specifically configured to: if determining, based on the home identifier and the correspondence between the home identifier and the gateway user plane device, that the gateway user plane device corresponding to the home identifier does not exist, determine a first target user plane device based on service level agreement SLA information of the first user equipment and/or load of each gateway user plane device.

In a possible implementation, the request packet is broadcast to a plurality of gateway user plane devices.

According to a seventh aspect of this application, a communication device is provided. The device includes a processor and a memory. The memory is configured to store instructions or a computer program. The processor is configured to execute the instructions or the computer program in the memory, to enable the communication device to perform the method according to the first aspect.

According to an eighth aspect of this application, a communication device is provided. The device includes a processor and a memory. The memory is configured to store instructions or a computer program. The processor is configured to execute the instructions or the computer program in the memory, to enable the communication device to perform the method according to the second aspect or the method according to the third aspect.

According to a ninth aspect of this application, a computer-readable storage medium is provided, including instructions. When the instructions are run on a computer, the computer is enabled to perform the method according to the first aspect, or perform the method according to the second aspect, or perform the method according to the third aspect.

According to the technical solutions provided in this application, after receiving a request packet sent by the first user equipment, the gateway control plane device obtains the home identifier corresponding to the first user equipment based on user information of the first user equipment, and sends the first packet including the home identifier to the control device. The control device obtains the home identifier by parsing the first packet, and determines, based on the home identifier, a corresponding gateway user plane device when the first user equipment goes online, that is, the first target gateway user plane device. In other words, when allocating the gateway user plane device to the first user equipment, the control device performs allocation based on the home identifier, to ensure that a plurality of user equipments corresponding to the home identifier are allocated to a same gateway user plane device. In this way, different user equipments of a same home can go online through the same gateway user plane device, thereby facilitating home-based unified management.

BRIEF DESCRIPTION OF THE DRAWINGS

To describe the technical solutions in embodiments of this application more clearly, the following briefly describes the accompanying drawings requiring for describing the embodiments. It is clear that the accompanying drawings in the following descriptions show some embodiments of this application, and a person of ordinary skill in the art may still derive other drawings from these accompanying drawings without creative efforts.

DETAILED DESCRIPTION OF ILLUSTRATIVE EMBODIMENTS

To make a person skilled in the art understand the technical solutions in the present invention better, the following clearly and describes the technical solutions in embodiments of the present invention with reference to the accompanying drawings in embodiments of the present invention. It is clear that the described embodiments are merely some but not all of embodiments of the present invention.

With the development of a software-defined networking (SDN) technology and a network function virtualization (NFV) technology, a metropolitan area network evolves from a conventional network-centric architecture to a data center-centric network architecture, and a conventional network element device also evolves from professional to universal. The evolution of the conventional network element device from professional to universal mainly resolves two decouplings: a decoupling of control and forwarding, and a decoupling of software and hardware. As a conventional broadband access gateway device, a BNG is very important in user broadband access services and scenarios. With the emergence of various Internet services, requirements for a quantity of user sessions supported by the BNG device are increasingly higher, user access bandwidth is increased, and especially requirements for the BNG device to provide service openness and programmability externally are increasingly higher. Based on these factors, the BNGs implements the two decouplings based on an SDN/NFV architecture. After forwarding and control of the BNG are decoupled, a control plane CP may manage a plurality of forwarding planes UPs, to implement resource scheduling between the plurality of forwarding planes.

Figure 1A:
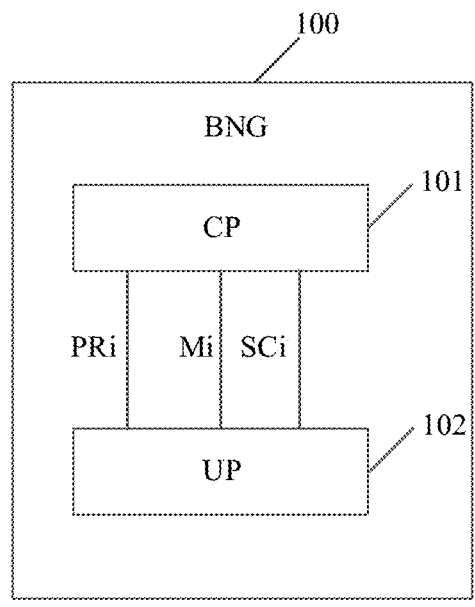
FIG. 1A is a schematic diagram of a structure of a BNG according to an embodiment of this application.

FIG. 1A is a diagram of a structure of a network according to an embodiment of this application. In the figure, the broadband network gateway BNG100 may include a control plane device CP101 and a user plane device UP102. Generally, there may be a plurality of interfaces between the UP102 and the CP101, and three types of interfaces are as follows:

PRi: It is a service interface and uses a virtual extensible local area network generic protocol extension (VXLAN GPE) interface. The UP102 receives an access protocol packet from user equipment, and encapsulates and sends the access protocol packet to the CP101 through the interface. The CP101 processes the access protocol packet.

Mi: It is a management interface and uses a network configuration (NETCONF) interface. The CP101 delivers configuration information to the UP102 through this interface, and the UP102 reports a running status of the UP102 through this interface.

SCi: It is a control interface and uses a control plane and user plane separated protocol (CUSP) interface. After the CP101 processes an access protocol packet and completes protocol interaction with user equipment, the CP101 delivers an entry corresponding to the user equipment to the corresponding UP102 through this interface.

The BNG virtualized by using the SDN and NFV technologies may be implemented as a virtual broadband network gateway (vBNG) whose structure is similar to that in FIG. 1A. The vBNG includes a virtual broadband network gateway control plane vBNG-CP and a vBNG-UP. Specifically, the vBNG-CP may be used as a virtualized network function (VNF) and run on an x86 server to implement virtualization. The vBNG-UP has two forms, one is a virtual UP (vUP) in a VNF (an x86 server virtualized network element), and the other is a physical user plane (pUP) in a physical network function (PNF) (conventional hardware network device). One vBNG-CP may manage a plurality of pUPs and vUPs.

Figure 1B:
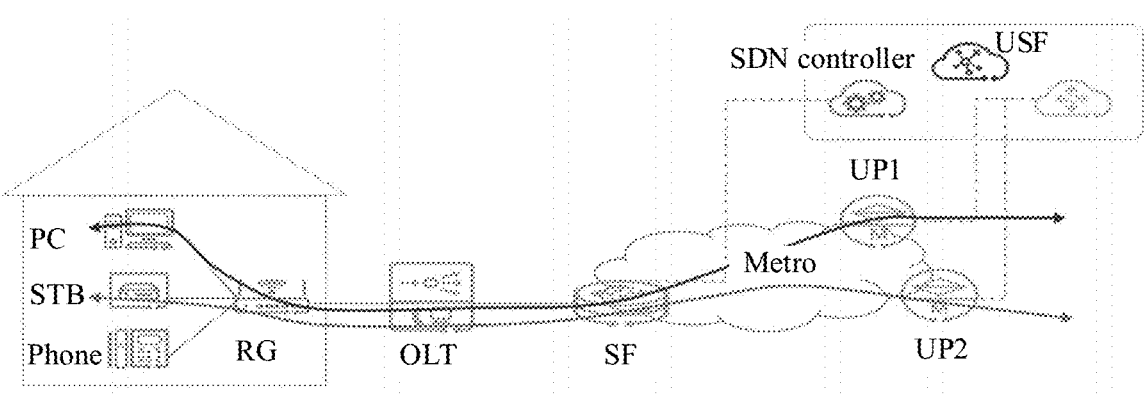
FIG. 1B is a schematic diagram of an allocation scenario of a gateway user plane device.

The CP may manage a plurality of UPs, and users perform management on the CP in a unified manner. Therefore, users can be flexibly scheduled between the UPs based on the quantity of user sessions, traffic load, and the like. BNG-UPs have two deployment scenarios, namely, a centralized scenario and a distributed scenario. In the distributed scenario, the BNG-UPs can be deployed in counties. In the centralized mode, the BNG-UPs are generally deployed in cities to carry services of an entire city. However, a home may have a plurality of dial-up sessions, for example, a high speed input (HSI) session and an Internet Protocol television (IPTV) session. To ensure fair use of network resources for different homes, operators usually schedule a unified rate for a home. For example, a home has two sessions, one is the HIS session, and the other is the IPTV session. The rate is unified to 200 M. An IPTV needs to exclusively occupy wo M during use, and an HIS can only use remaining 100 M. When the IPTV is not used, the HIS can occupy bandwidth of 200 M. On an existing network, a UP steering function (USF) device can allocate different user equipments of a same home to a plurality of UPs based on UP load and an SLA of the user equipment, and consequently home-based unified management cannot be performed. The USF device may also be referred to as a user plane selection function (UPSF) device. For example, as shown in FIG. 1B, descriptions are provided by using an example in which a home includes three user equipments, namely, a set top box (STB), which is generally referred to as a set-top box, a personal computer (PC), and a phone Phone. The PC goes online through a residential gateway (RG), an optical line termination (OLT), a steering function (SF) device, and a UP1. The STB goes online through the RG, the OLT, the SF device, and a UP2. When rate limiting is performed based on a home, different user equipments in a same home go online through different UPs, and consequently rate limiting is inaccurate.

Based on this, embodiments of this application provide a method for controlling user equipment to access a network, to allocate different sessions of a same home to a same UP, thereby implementing unified rate limiting and scheduling. Specifically, when sending a request packet sent by first user equipment to a control device, a gateway control plane device obtains a home identifier corresponding to the first user equipment based on user information of the first user equipment, and sends the request packet including the home identifier to the control device. The control device obtains the home identifier by parsing the request packet, and determines, based on the home identifier, a corresponding gateway user plane device when the first user equipment goes online, that is, a first target gateway user plane device. In other words, when allocating the gateway user plane device to the first user equipment, the control device performs allocation based on the home identifier, to ensure that a plurality of user equipments corresponding to the home identifier are allocated to a same gateway user plane device. In this way, different user equipments of a same home can go online through the same gateway user plane device, thereby facilitating home-based rate limiting processing.

For ease of understanding functions of network elements in embodiments of this application, descriptions are provided below with reference to the accompanying drawings.

Figure 2:
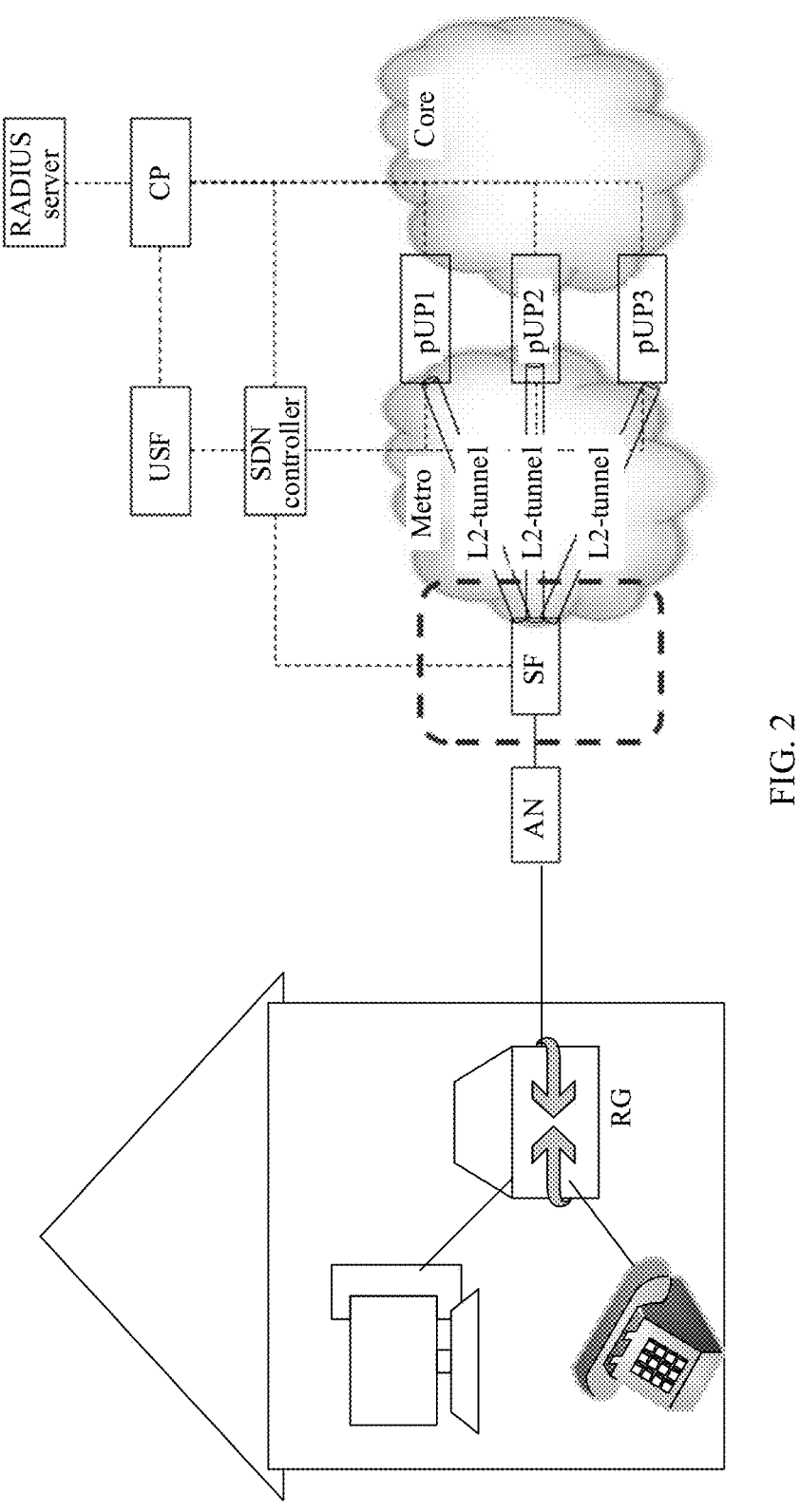
FIG. 2 is a schematic diagram of a structure of a network according to an embodiment of this application.

Refer to a schematic diagram of an application scenario shown in FIG. 2. The vBNG-UP may be distributed at an edge of a network, or may be distributed at a relatively high location in a network. To dynamically select a vBNG-UP for access by a user, the vBNG-CP needs to cooperate with an SDN controller, to implement dynamic migration of the user.

The vBNG-CP is a vBNG service control plane, and is configured to process a user dial-up protocol packet, and interact with an authentication, authorization, and accounting (AAA) server for user authentication, accounting, and authorization. The vBNG-CP identifies, based on a user account, a service level agreement (service level agreement, SLA) to which the user has subscribed, and maps, by using access line information carried in the user dial-up protocol packet, the user to a port accessed by a corresponding UP. In addition, the vBNG-CP delivers a routing entry of user equipment to a corresponding UP, and the corresponding UP generates a forwarding entry of the user and publishes a route to the outside.

The vBNG-UP includes a pUP1, a pUP2, and a pUP3. When the user goes online, the user dial-up protocol packet is sent to the vBNG-CP through a service channel for processing. The vBNG-CP delivers a routing entry of the user after processing user online. The vBNG-UP receives the route entry delivered by the vBNG-CP, locally generates a forwarding entry of the user to execute a related service policy and forward traffic, and publishes a route to the outside.

A steering function SF device exists between an access network (AN) device and the vBNG-UP, and a layer 2 tunnel is established between the SF device and each vBNG-UP. A physical interface between the SF device and the AN device is divided into different sub-interfaces, and different sub-interfaces correspond to layer 2 tunnels of different vBNG-UPs. The SF device may run on the AN device, or may run on a device independent of the AN device. This is not specifically limited in this embodiment of this application.

By default, the user goes online from the pUP1. The pUP1 forwards a user protocol packet to the vBNG-CP, and the vBNG-CP sends user information (for example, including a user identifier, service level agreement SLA information, and online location information) to the USF device. The USF device may determine, based on the user information, that the user should access from the pUP2, and notify the vBNG-CP to deliver the route entry to the pUP2. In addition, the USF device notifies the SDN controller to configure the SF device, and configure a virtual local area network (VLAN) or QinQ corresponding to the user on a sub-interface that is between the SF device and the AN device and that corresponds to the pUP2. QinQ refers to two VLAN identifiers, for example, SVLAN+CVLAN, where the "SVLAN" refers to a service VLAN (service VLAN), and the "CVLAN" refers to a customer VLAN (customer VLAN).

The SF device directly forwards a subsequent user packet to the pUP2 through a layer 2 tunnel between the SF device and the pUP2.

The USF device is a dynamic migration policy point. The vBNG-CP device need to query the USF device to determine a vBNG-UP to which a routing entry is delivered. In addition, the USF device needs to notify the SDN controller to configure the SF device. The USF device may be built in the vBNG-CP, may be built in the SDN controller, or may be an independent network element.

An access node (AN) aggregates home terminals, aggregates users to the UP, forwards layer 2 packets, and isolates users by using a local area network (VLAN) or QinQ. Each user exclusively uses a VLAN or QinQ. The AN may be a switch (SW) or an OLT.

A residential gateway (RG) accesses user equipments such as a PC and a mobile phone in a home, generally performs network address translation (network address translation, NAT) processing, and allocates private internet protocol (IP) addresses to the user equipments such as the PC and the mobile phone in the home. In addition, the RG supports point-to-point protocol over Ethernet (PPPoE) and Internet Protocol over Ethernet (IPoE) dial-up, and obtains an IP from the vBNG for network access.

The foregoing describes the network architecture and some implementation processes implemented in embodiments of this application. The following describes the solutions provided in embodiments of this application with reference to specific implementation processes.

Figure 3A:
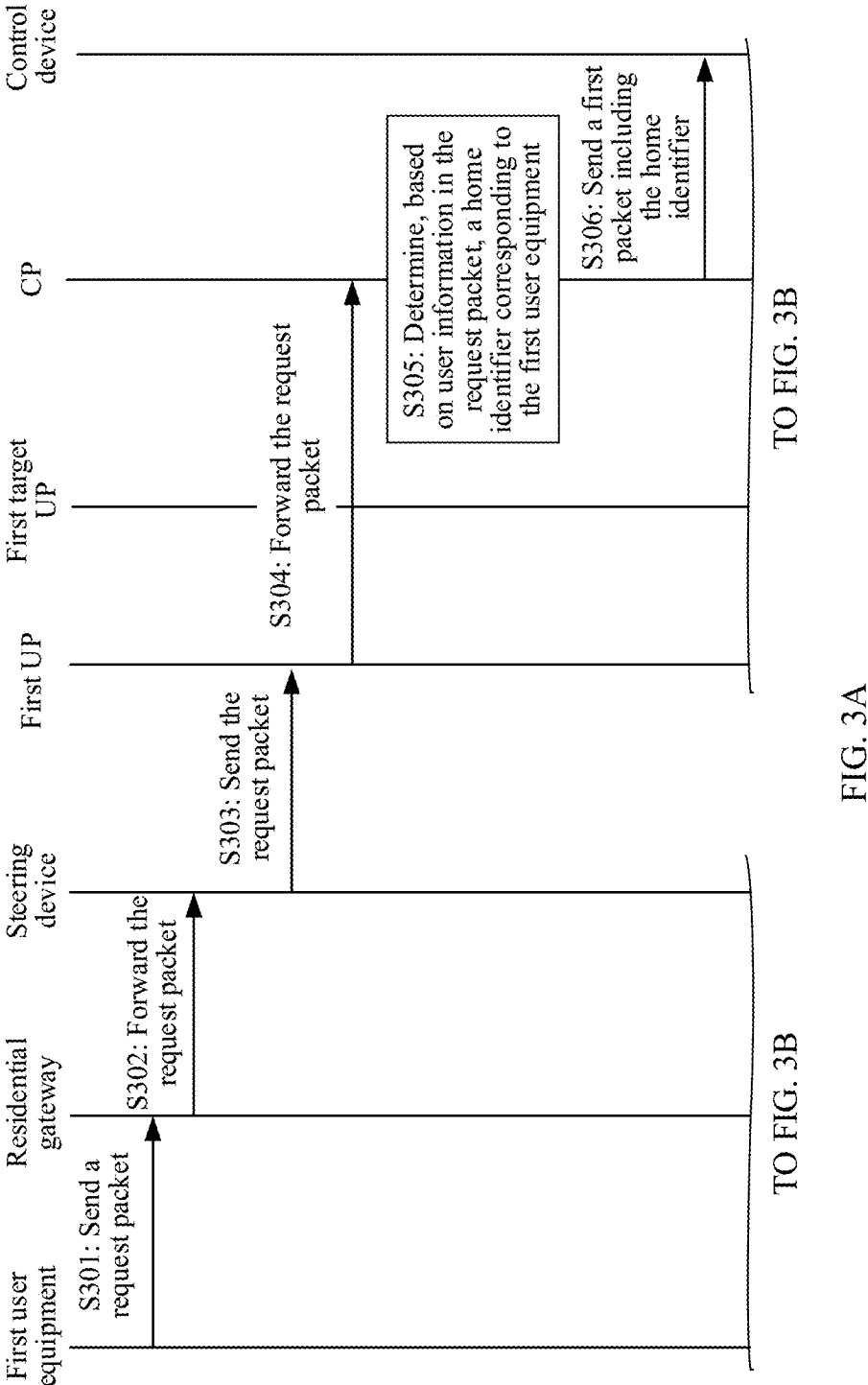
FIG. 3A and FIG. 3B are a flowchart of a method for controlling user equipment to access a network according to an embodiment of this application.
Figure 3B:
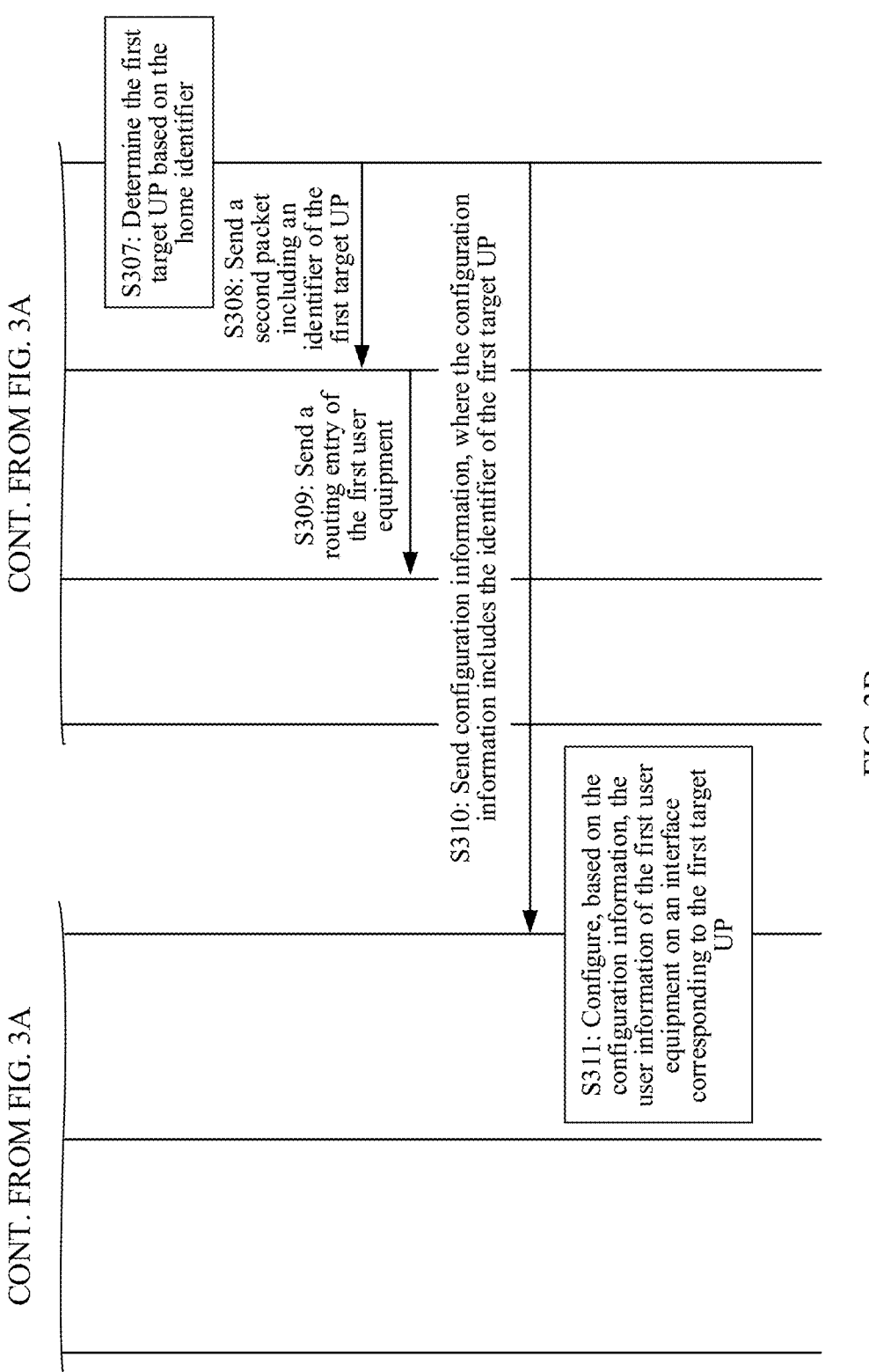

FIG. 3A and FIG. 3B are a flowchart of a method for controlling user equipment to access a network according to an embodiment of this application. As shown in FIG. 3A and FIG. 3B, the method may include the following steps.

S301: First user equipment sends a request packet to a residential gateway, where the request packet is used to request the first user equipment to access a network.

S302: The residential gateway forwards the request packet to a steering device.

When the first user equipment needs to access the network, the first user equipment may send a request packet to the steering device through a residential gateway corresponding to the first user equipment, to request to access the network through the request packet. The request packet may include user information, and the user information may include a user identifier. The user identifier may be MAC+SVLAN+CVLAN. The "MAC" refers to a Media Access Control (MAC) address of the first user equipment.

The first user equipment may perform dialing by using a point-to-point protocol over Ethernet (PPPoE) or a dynamic host configuration protocol (DHCP). In other words, the request packet may be a PPPoE packet or a DHCP packet.

S303: The steering device sends the request packet to a first UP.

In this embodiment, after receiving the request packet forwarded by the residential gateway, the steering device may directly forward the request packet to the first UP. Alternatively, the steering device may add location information to the request packet, where the location information may include an identifier and an interface identifier of the steering device. Specifically, the location information may include an identifier of the SF device and an identifier of a physical interface of the SF device. An identifier of a physical port may be represented as a slot identifier+a port identifier. In this way, when there are a plurality of SF devices in a system, and each SF device has a plurality of physical interfaces connected to the AN device, the SDN controller can know which SF interface (a physical interface and a sub-interface) of which SF device is configured. The first UP is a default UP (for example, the pUP1 in FIG. 2), and an interface indicated by the added interface identifier is a sub-interface corresponding to the first UP in the steering device.

When the request packet is a DHCP packet, the identifier of the SF device and the identifier of the customer physical port on the SF device may be added by adding an OPTION82 or OPTION18 field. When the request packet is a PPPoE packet, an identifier of an access device and the identifier of the customer physical port on the SF device may be added by using a PPPoE+ technology.

S304: The first UP forwards the request packet to a CP.

S305: The CP obtains, based on the user information in the request packet, a home identifier corresponding to the first user equipment.

In this embodiment, after receiving the request packet sent by the first UP, the CP obtains the user information of the first user equipment by parsing the request packet, to determine, based on the user information, the home identifier corresponding to the first user equipment. The user information may include a user identifier and location information, and the CP determines the home identifier based on the user identifier and the location information. Specifically, the CP may allocate the home identifier to the first user equipment based on the user identifier and the location information. Alternatively, the CP may send a third packet including the user information to the AAA server. The AAA server determines, based on the user information, the home identifier corresponding to the first user equipment, and sends a fourth packet including the home identifier to the CP.

After obtaining the home identifier corresponding to the first user equipment, the CP generates a first packet, where the first packet includes the home identifier.

S306: The CP sends the first packet including the home identifier to a control device.

S307: The control device determines a first target UP based on the home identifier.

In this embodiment, after obtaining the home identifier corresponding to the first user equipment, the CP sends the first packet including the home identifier to the control device, to request the control device to determine the first target UP.

Specifically, after obtaining the home identifier, the control device checks, based on the home identifier, whether the gateway user plane device corresponding to the home identifier exists. Specifically, the control device may check, based on the home identifier and a correspondence between the home identifier and the gateway user plane device, whether the gateway user plane device corresponding to the home identifier exists. The control device may pre-store the correspondence between the home identifier and the gateway user plane device.

If the gateway user plane device corresponding to the home identifier exists, it indicates that another user equipment in a home indicated by the home identifier has gone online, and the control device has allocated a gateway user plane device to the another user equipment, and the gateway user plane device is determined as a first target gateway user plane device. If the gateway user plane device corresponding to the home identifier does not exist, it indicates that the first user equipment is first user equipment that applies for going online in the home indicated by the home identifier, and the control device determines the first target user equipment. In an example, the control device may determine, based on load of each UP associated with the CP, a UP used by the first user equipment to access the network. For example, if load of the pUP2 is relatively light, and load of the pUP1 is relatively heavy, the pUP2 can provide better quality of service, so that it may be determined that the UP used by the first user equipment to access the network is the pUP2. In another example, the control device may determine, based on SLA information of the first user equipment, the UP used by the first user equipment to access the network. For example, the UP used by the first user equipment to access the network is determined based on a correspondence between an SLA and the UP. After receiving the request packet from the first UP, the CP may perform identity authentication on the first user equipment through the AAA server, and obtain the SLA information of the first user equipment. When sending the request packet to the control device, the CP adds the SLA information of the first user equipment to the request packet. The first target UP may be the first UP or another UP.

S308: The control device sends, to the CP, a second packet including an identifier of the first target UP.

S309: The CP sends a routing entry of the first user equipment to the first target UP.

After receiving the second packet sent by the control device, the CP obtains the identifier of the first target UP through parsing, to determine that the first user equipment accesses the network through the first target UP. Further, the CP sends the route entry of the first user equipment to the first target UP, so that the first target UP generates a forwarding entry of the first user equipment, and publishes a route to the outside.

In some embodiments, in addition to sending the route entry of the first user equipment to the first target UP, the CP may further allocate an IP address to the first user equipment, and send, to the first user equipment through the first UP, the IP address allocated to the first user equipment. In an example, the CP may allocate the IP address to the first user equipment from a network segment corresponding to the first target UP. When another user equipment that has gone online exists and a service type of the another user equipment is the same as a service type of the first user equipment, the IP address may be allocated to the first user equipment in the same network segment corresponding to the first target UP.

In some embodiments, after sending the route entry of the first user equipment to the first target UP, the CP may send a notification message to the control device, to notify the control device that the route entry of the first user equipment has been sent to the first target UP.

S310: The control device sends configuration information to the steering device.

S311: The steering device configures, based on the configuration information, the user information of the first user equipment on an interface corresponding to the first target UP.

In this embodiment, the control device sends the configuration information to the steering device while determining the first target UP, where the configuration information may include the identifier of the first target UP and the user information of the first user equipment. The user information may include a user identifier (for example, MAC+SVLAN+CVLAN) and location information. The steering device configures, based on the configuration information, the user identifier of the first user equipment on the interface corresponding to the first target UP, so that the first user equipment transmits a packet through the first target UP. Specifically, the steering device configures CVLAN+SVLAN in the user identifier on a target interface, to migrate traffic of the first user equipment to the first target UP. The target interface may be determined based on the identifier of the first target UP.

As can be seen from the descriptions provided above, after receiving a request packet sent by the first user equipment, the gateway control plane device obtains the home identifier corresponding to the first user equipment based on user information of the first user equipment, and sends the first packet including the home identifier to the control device. The control device obtains the home identifier by parsing the first packet, and determines, based on the home identifier, a corresponding gateway user plane device when the first user equipment goes online, that is, the first target gateway user plane device. In other words, when allocating the gateway user plane device to the first user equipment, the control device performs allocation based on the home identifier, to ensure that a plurality of user equipments corresponding to the home identifier are allocated to a same gateway user plane device. In this way, different user equipments of a same home can go online through the same gateway user plane device, thereby facilitating home-based unified management.

In an actual application, the control device may obtain load of each UP of the CP and service load of user equipment served by each UP, and migrate the user based on a load sharing policy, to ensure quality of service. Based on this, the control device may control the user equipment to migrate from a currently corresponding UP to a UP with relatively light load. To implement home-based unified management, when the user equipment is migrated, all user equipments in a home can be migrated to a same UP by using a home as a unit. For ease of understanding, descriptions are provided below with reference to the accompanying drawings.

Figure 4:
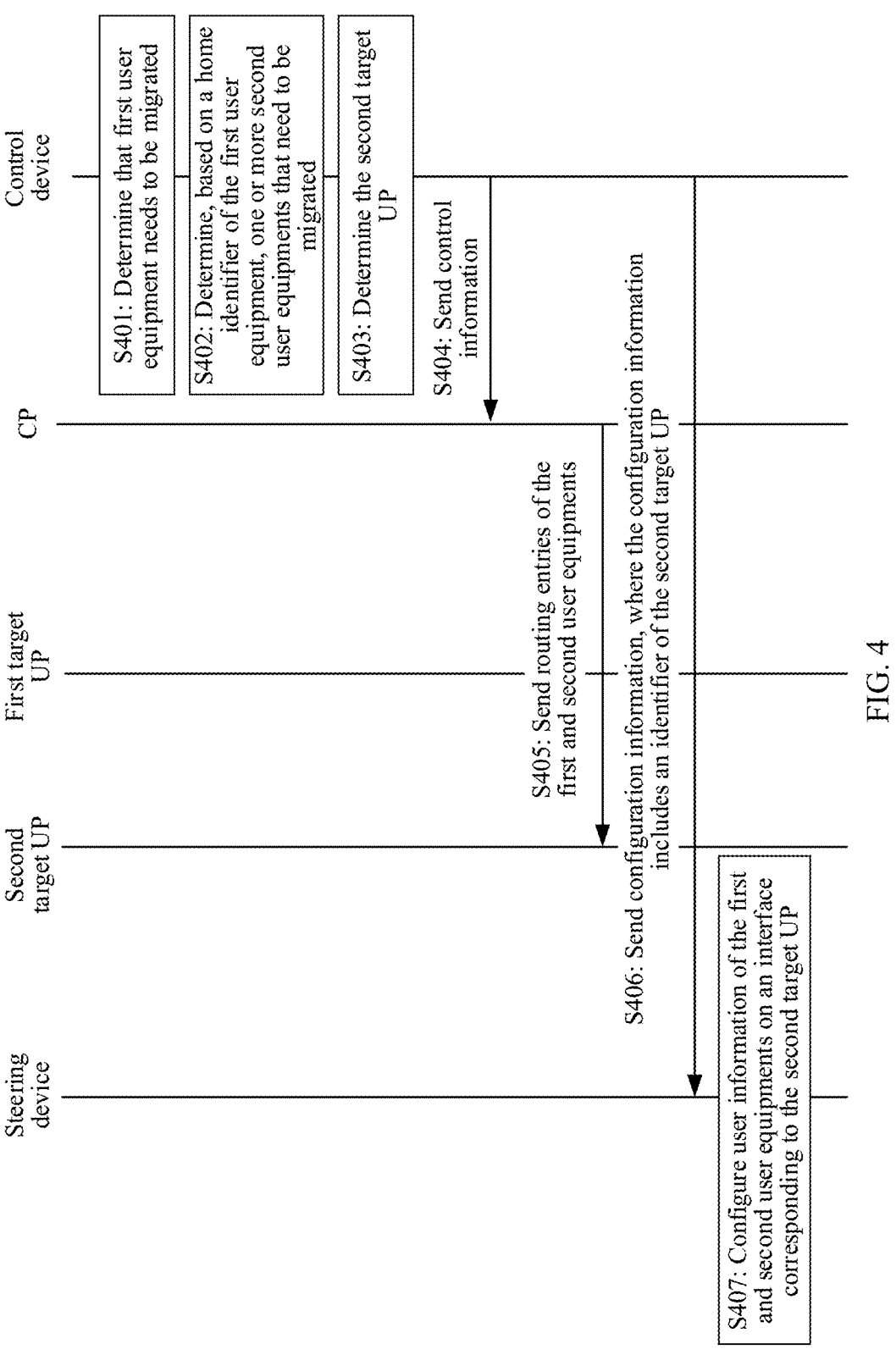
FIG. 4 is a flowchart of another method for controlling user equipment to access a network according to an embodiment of this application.

FIG. 4 is a flowchart of a method for controlling user equipment to access a network according to an embodiment of this application. As shown in FIG. 4, the method may include the following steps.

S401: A control device determines that first user equipment is to be migrated.

In this embodiment, the control device may determine, based on a service traffic volume of the first user equipment and/or a service level agreement SLA corresponding to the user equipment, whether the first user equipment needs to be migrated.

In an example, the control device may obtain service load of each user equipment in the first target UP, to determine whether service load of the first user equipment is greater than a first preset threshold. If the service load of the first user equipment is greater than the first preset threshold, it indicates that the first target UP cannot meet a transmission service of the first user equipment. To ensure service transmission quality of the first user equipment, it is determined that the first user equipment needs to be migrated. Alternatively, whether the service load of the first user equipment is less than a second preset threshold is determined. If the service load of the first user equipment is less than the second preset threshold, it indicates that service traffic of the first user equipment is relatively small. To avoid a resource waste on the first target UP, the first user equipment may be migrated to another UP that meets a transmission requirement of the first user equipment.

In another example, the control device may obtain an SLA corresponding to each user equipment in the first target UP. When an SLA of the first user equipment changes, to ensure an SLA requirement of the first user equipment, the first user equipment is migrated to another UP that meets the SLA requirement of the first user equipment.

S402: The control device determines, based on a home identifier corresponding to the first user equipment, one or more second user equipments that need to be migrated.

In this embodiment, when determining that the first user equipment needs to be migrated, the control device determines, based on the home identifier corresponding to the first user equipment, whether there is a second user equipment that belongs to a home and has already goes online, to implement unified management of different user equipments of the same home. If there is a second user equipment that belongs to a home and has already goes online, it is determined that another device also needs to be migrated. Specifically, the control device may pre-store a correspondence between a home identifier and each user equipment that goes online. When the control device needs to check an online user equipment corresponding to the home identifier, the control device may determine, based on the correspondence, one or more user equipments that have gone online and corresponding to the home identifier.

S403: The control device determines a second target UP.

In this embodiment, when determining that the first user equipment needs to be migrated, the control device may determine the second target UP based on a migration rule. The migration rule may include a quantity of sessions corresponding to the UP, service load of the UP, quality of service that can be provided by the UP, and the like. A USF device may determine the second target UP based on one or more parameters in the migration rule, to migrate the first user equipment to the second target UP.

In an example, the second target UP may be determined based on the quantity of sessions corresponding to the UP. For example, a pUP3 corresponding to a CP and having a minimum quantity of sessions is determined as the second target UP. In another example, the second target UP may be determined based on the service load of the UP. For example, a pUP3 with minimum service load in the CP is determined as the second target UP. In still another example, the control device may determine the second target UP based on the quality of service that can be provided by the UPs. For example, if user equipment changes from a user level A to a user level B, and a pUP3 corresponds to the user level B, the pUP3 is determined as the second target UP.

S404: The control device sends control information to the CP.

In this embodiment, when determining the second target UP, the control device sends the control information to the CP, where the control information includes an identifier of the first user equipment, identifiers of the one or more second user equipments, and an identifier of the second target UP.

S405: The CP sends, to the second target UP based on the control information, a routing entry of each user equipment corresponding to the home identifier.

In this embodiment, when receiving control information sent by the USF device, the CP determines, by parsing the control information, to migrate user equipment corresponding to the home identifier from the first target UP to the second target UP. The CP controls the first target UP to delete the stored route entry related to each user equipment, and delivers the route entry of each user equipment to the second target UP.

In some embodiments, the CP may further allocate IP addresses to the first user equipment and the second user equipment, and separately send the allocated IP addresses to the first user equipment and the second user equipment through the first target UP. When service types of the first user equipment and the second user equipment are the same, the CP may separately allocate the IP address to the first user equipment and the second user equipment in a same network segment corresponding to the second target UP.

S406: The control device sends configuration information to a steering device.

Specifically, the USF device sends migration information to an SDN controller, where the migration information indicates to migrate the first user equipment from an interface corresponding to the first target UP to an interface corresponding to the second target UP. The SDN controller determines, based on the migration information, that the SF device needs to be controlled to configure, on the interface corresponding to the second target UP, user information of each user equipment corresponding to the home identifier, and the SDN controller sends the configuration information to the SF device. The configuration information may include an identifier of the steering device, interface information corresponding to the second target UP, the user information of each user equipment corresponding to the home identifier, and the like. The user equipment includes the first user equipment and the second user equipment.

S407: The steering device configures the user information of each user equipment on the interface corresponding to the second target UP.

In this embodiment, after receiving the migration information, the SF device determines that the user equipment that has gone online and that corresponds to the home identifier needs to be migrated from the interface corresponding to the first target UP to the interface corresponding to the second target UP, deletes user information that is related to each user equipment and that is configured on the interface corresponding to the first target UP, and configures the user information related to each user equipment on the interface corresponding to the second target UP.

It is to be noted that, when performing a migration operation, the control device may perform migration based on a user, perform migration based on an interface, or perform migration based on a gateway. When any one of the foregoing migration operations is performed, and when user equipment to be migrated is determined, whether the user equipment is a home user needs to be determined. When the user equipment is a home user, a home identifier of the user equipment is obtained, and another user equipment needs to be migrated is determined based on the home identifier, to implement migration by using a home as a unit, and ensure that all user equipments belonging to a same home are migrated to a same UP.

The foregoing embodiments describe an implementation process in which the USF device is used as user equipment to determine a corresponding gateway user plane device when the user equipment goes online. In some application scenarios, a gateway control plane device may also be used as user equipment to determine the corresponding gateway user plane device when the user equipment goes online. For ease of understanding, descriptions are provided below with reference to the accompanying drawings. Refer to a schematic diagram of an application scenario shown in FIG. 5A. The network structure includes two home terminals, namely, an RG1 and an RG2, and access nodes AN, UP1, UP2, and CP. In addition, as shown in FIG. 2B, a metro edge router (MER) may be further included between the AN and the UP, and the MER may include an MER1 and an MER2. The MER1 is connected to the AN, and the MER2 is separately connected to the UP1 and the UP2. A layer 2 tunnel may be established between the MER1 and the MER2 to forward a user dial-up packet to each UP. The layer 2 tunnel may be a virtual extensible local area network (VXLAN), an Ethernet virtual private network (EVPN), a multi-protocol label switching (MPLS), or the like. Descriptions are provided below by using an application scenario shown in FIG. 5A or FIG. 5B as an example.

Figure 6:
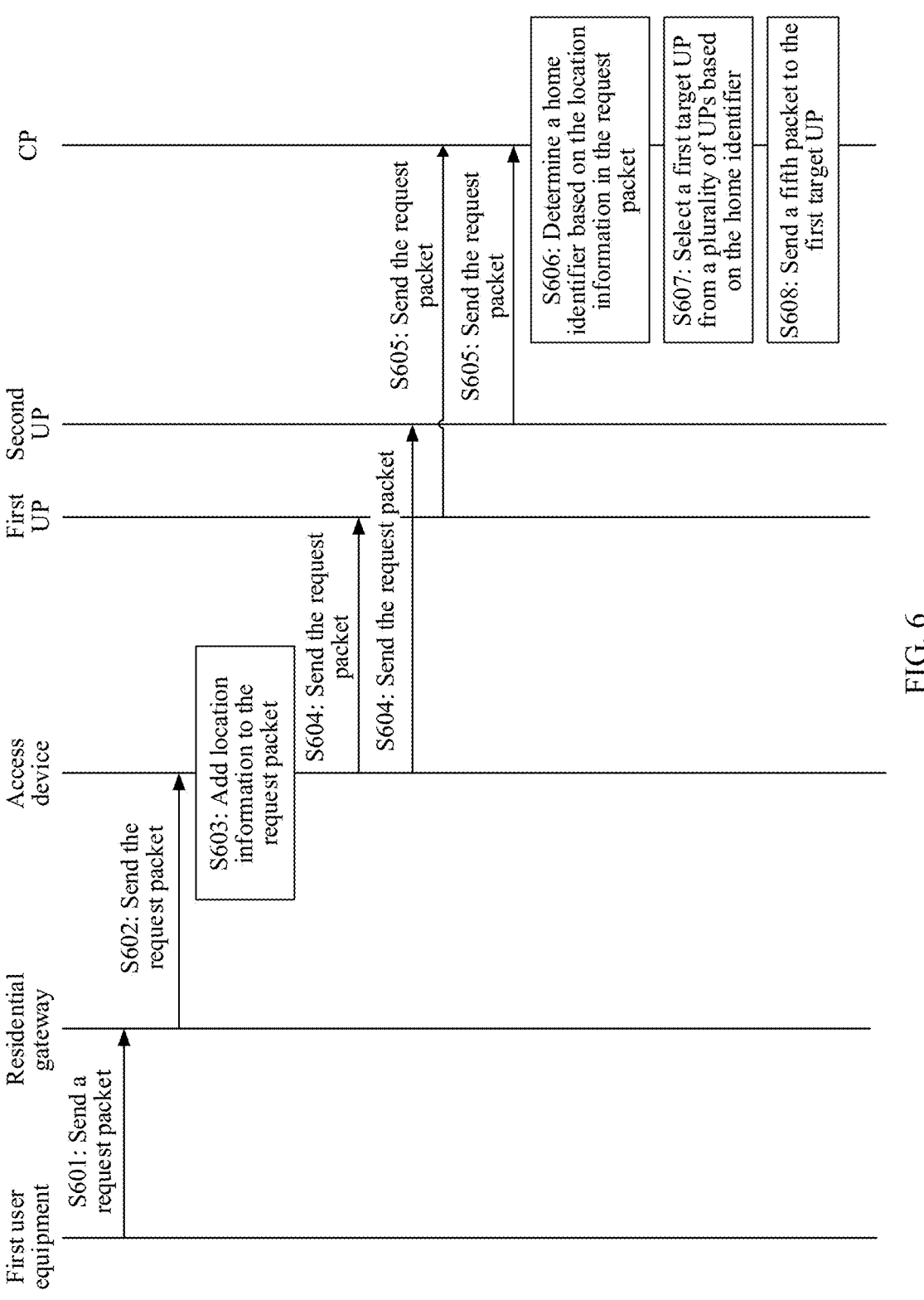
FIG. 6 is a flowchart of still another method for controlling user equipment to access a network according to an embodiment of this application.

FIG. 6 is a flowchart of a method for controlling user equipment to access a network according to an embodiment of this application. As shown in FIG. 6, the method may include the following steps.

S601: First user equipment sends a request packet to a residential gateway, where the request packet is used to request the first user equipment to access a network.

S602: The residential gateway forwards the request packet to an access device.

Figure 5A:
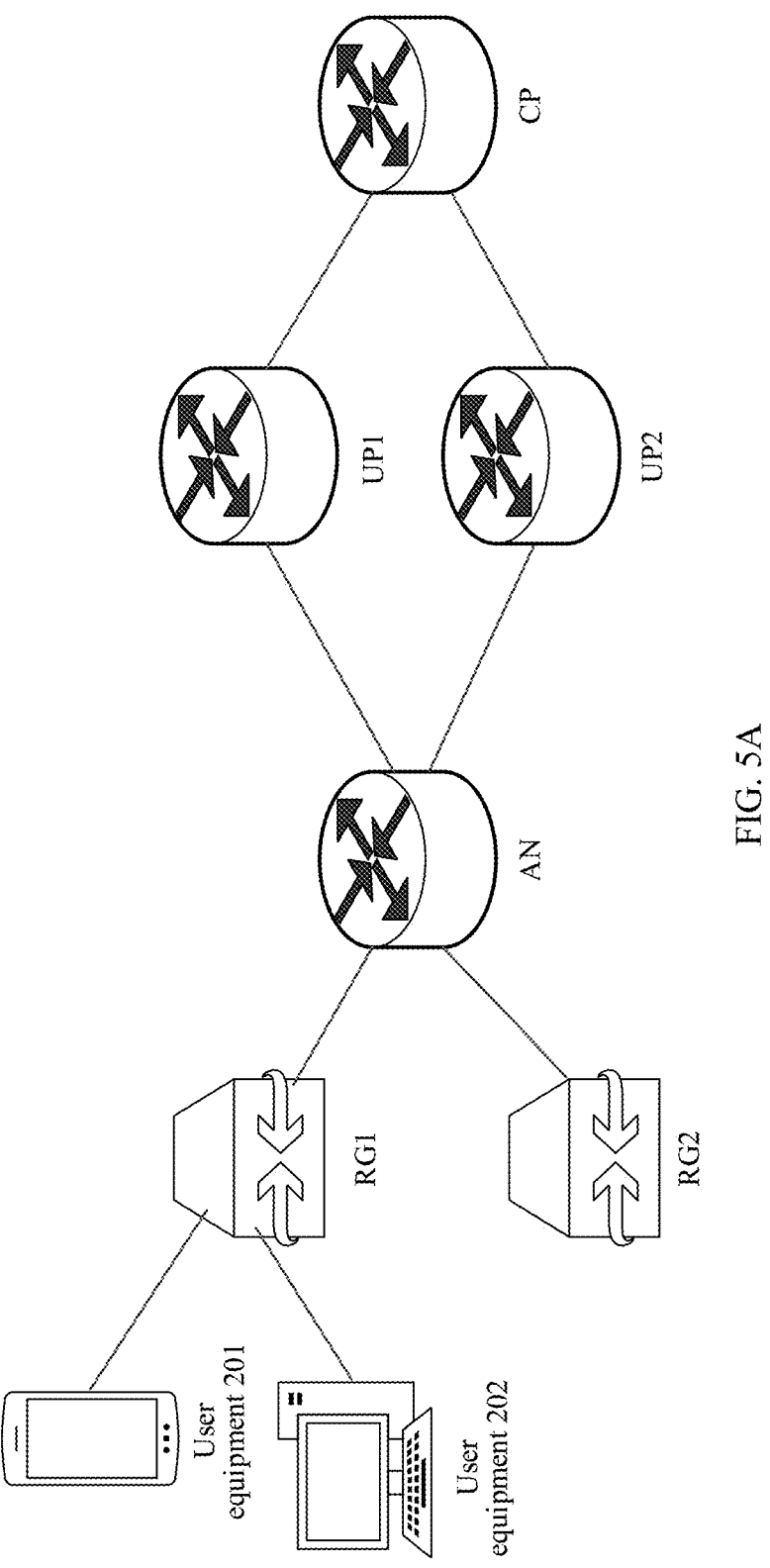
FIG. 5A is a schematic diagram of an application scenario according to an embodiment of this application.
Figure 5B:
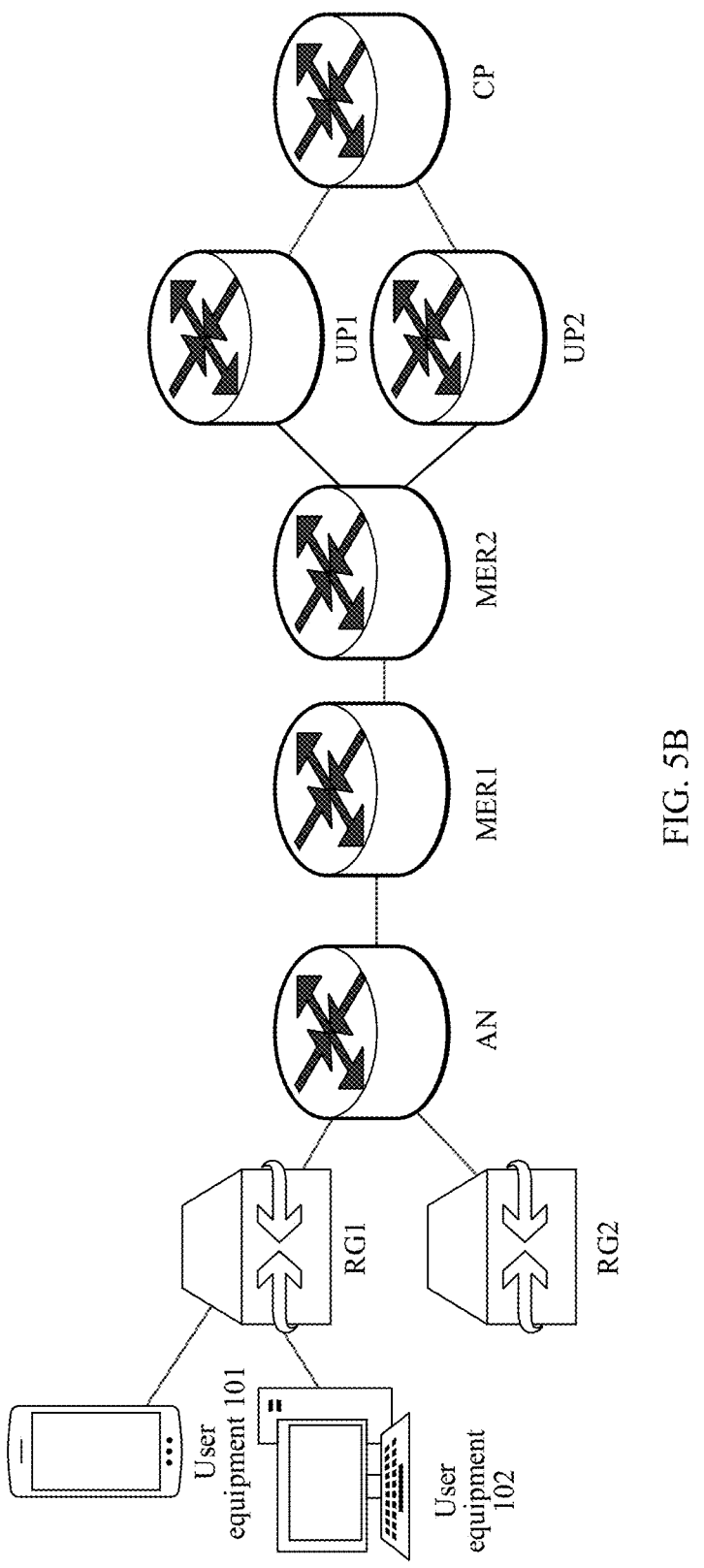
FIG. 5B is a schematic diagram of another application scenario according to an embodiment of this application.

When the first user equipment needs to access a network, the first user equipment may send a request packet to the access device through a residential gateway corresponding to the first user equipment, to request to access the network by using the request packet. For example, as shown in FIG. 5A or FIG. 5B, the first user equipment is user equipment 201, which sends a request packet to an RGW1. The RGW1 sends the request packet to an access device AN.

The first user equipment may perform dialing by using a point-to-point protocol over Ethernet (PPPoE) or a dynamic host configuration protocol (DHCP). In other words, the request packet may be a PPPoE packet or a DHCP packet.

S603: The access device adds location information to the request packet, where the location information includes an identifier and an interface identifier of the access device, and the interface identifier corresponds to the residential gateway.

In this embodiment, after receiving the request packet forwarded by the residential gateway, the access device adds location information to the request packet, where the location information may include an identifier and an interface identifier of the access device, and the interface identifier corresponds to the residential gateway. In other words, when receiving the request packet forwarded by the residential gateway, the access device obtains an interface corresponding to the residential gateway, and adds an identifier of the interface to the request packet. Specifically, the access device may store a correspondence between the interface identifier and a residential gateway identifier, where the request packet includes the residential gateway identifier. After receiving the request packet, the access device may determine the interface identifier based on the correspondence and the residential gateway identifier. The interface identifier of the access device may be a service virtual local area network (SVLAN) label, and the residential gateway identifier may be a customer virtual local area network (CVLAN) label.

Generally, a network system includes a plurality of access devices. To identify from which access device to go online in subsequent operations, an identifier of the access device is added to a request packet. When the request packet is a DHCP packet, the identifier and the interface identifier of the access device may be added by adding an OPTION82 or OPTION18 field. When the request packet is a PPPoE packet, the identifier and the interface identifier of the access device may be added by using a PPPoE+ technology. For example, the access device is an OLT, and location information added includes OLT_ID/ANI_frame/ANI_slot/ANI- _subslot/ANI_port/ONU_ID, where the information includes identity document (identity document, ID) information of the OLT and corresponding interface information.

In a specific implementation, different interfaces of the access device may correspond to different residential gateways, and one interface may correspond to a plurality of residential gateways or one interface corresponds to only one residential gateway. As shown in FIG. 5A or FIG. 5B, an interface 1 of the AN corresponds to the RGW1, and an interface 2 of the AN corresponds to the RGW2, or an interface 1 of the AN serves both the RGW1 and the RGW2. The access device may pre-store a correspondence between an interface and a residential gateway. After receiving a request packet sent by a residential gateway, the access device may determine an interface based on the correspondence, and then add an interface identifier to the request packet.

S604: The access device sends the request packet to a first UP.

In an example, when a metro router MER exists between the access device and the UP, where a layer 2 network is between the access device and the MER, the access device forwards the request packet to the MER through the layer 2 network, and then the MER forwards the request packet to each UP through the layer 2 network. As shown in FIG. 6B, the AN forwards a request packet to the MER1 through the layer 2 network, the MER1 forwards the request packet to the MER2, and then the MER2 forwards the request packet to the UP1 and the UP2. The MER may establish a layer 2 tunnel with each network device, and during packet forwarding, the request packet is encapsulated by using a tunneling protocol, to send an encapsulated request packet to the UP.

S605: The first UP forwards the request packet to a CP.

After adding the location information to the request packet, the access device may broadcast the request packet, so that each UP in the network can receive the request packet. Specifically, the access device may send the request packet to a default UP (for example, the UP1 in FIG. 5A or FIG. 5B). In an example, descriptions are provided by using an example in which the first UP sends a request packet to the CP.

S606: The CP determines a home identifier based on the location information in the request packet.

After receiving the request packet, the CP parses the request packet to obtain the location information. In addition, a home identifier of a home where the first user equipment is located is obtained based on the location information.

S607: The CP selects the first target UP from a plurality of gateway user plane devices based on the home identifier.

Specifically, after obtaining the home identifier, the CP may determine, based on the home identifier and a pre-stored correspondence, whether a gateway user plane device corresponding to the home identifier exists. If the gateway user plane device corresponding to the home identifier exists, the gateway user plane device corresponding to the home identifier is determined as the first target UP. If the gateway user plane device corresponding to the home identifier does not exist, the first target UP is determined based on the SLA information of the first user equipment and/or load of each gateway user plane device. The correspondence may include a correspondence between the home identifier and the gateway user plane device. In other words, when the gateway user plane device is determined for the first user equipment, first, whether there is another user equipment that is from a same home and that has gone online is determined based on the home identifier corresponding to the first user equipment. If there is another user equipment that is from the same home and that has gone online, a gateway user plane device corresponding to the another user equipment when the another user equipment goes online is determined as the first target UP. If there is no another user equipment that is from a same home and has gone online, the first target UP is determined based on the SLA information of the first user equipment and/or load of each gateway user plane device. For example, a UP with lightest load is determined from a plurality of UPs as the first target UP, so that the first user equipment goes online through the first target UP, thereby implementing load balancing. This avoids a problem of resource waste caused by uneven UP utilization. The first target UP may be the first UP or another UP.

S608: The CP sends a fifth packet to the first target UP.

After determining the first target UP, the CP sends a fifth packet to the first target UP, where the fifth packet may include a routing entry of the first user equipment, so that the first target UP generates a forwarding entry of the first user equipment.

As can be learned from the above, when the user equipment sends a dial-up packet, that is, a request packet, through the access device, the access device may add location information to the request packet, where the location information may indicate a residential gateway corresponding to the user equipment. The access device sends a request packet to the CP through the first UP. After receiving the request packet, the CP obtains a home identifier based on location information in the request packet, and then determines the first target UP based on the home identifier, so that different user equipments from a same home are allocated to a same UP, thereby implementing unified management of the home and improving efficiency.

Based on the foregoing method embodiments, embodiments of this application provide an apparatus for controlling user equipment to access a network. Descriptions are provided below with reference to the accompanying drawings.

Figure 7:
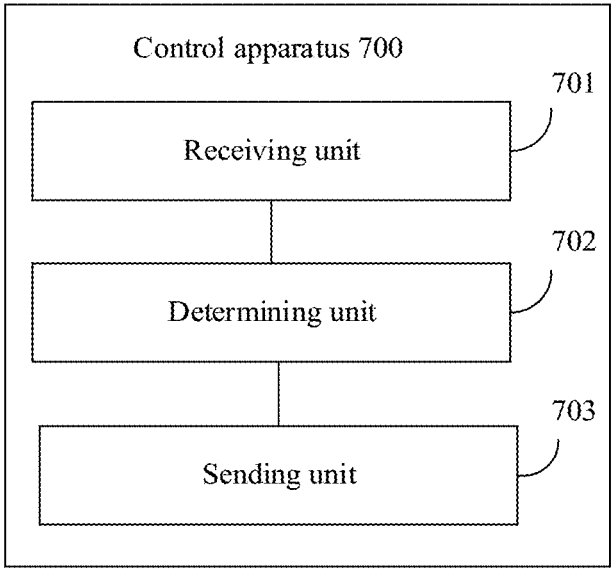
FIG. 7 is a diagram of a structure of an apparatus for controlling user equipment to access a network according to an embodiment of this application.

FIG. 7 is a diagram of a structure of an apparatus for controlling user equipment to access a network according to an embodiment of this application. As shown in FIG. 7, the apparatus 700 may implement a function of the control device in the foregoing embodiments. The apparatus may include a receiving unit 701, a determining unit 702, and a sending unit 703.

The receiving unit 701 is configured to receive a first packet sent by a gateway control plane device, where the first packet includes a home identifier corresponding to first user equipment. For a specific implementation of the receiving unit 701, refer to related descriptions of S306 in the embodiment shown in FIG. 3A and FIG. 3B.

The determining unit 702 is configured to determine a first target gateway user plane device based on the home identifier. For a specific implementation of the determining unit 702, refer to related descriptions of S307 in the embodiment shown in FIG. 3A and FIG. 3B.

The sending unit 703 is configured to send a fifth packet to the gateway control plane device, where the fifth packet includes an identifier of the first target gateway user plane device. For a specific implementation of the sending unit 703, refer to related descriptions of S308 in the example shown in FIG. 3A and FIG. 3B.

In a specific implementation, the determining unit 702 is specifically configured to: when determining, based on the home identifier and a correspondence between the home identifier and a gateway user plane device, that the gateway user plane device corresponding to the home identifier exists, determine the gateway user plane device corresponding to the home identifier as the first target gateway user plane device. For specific implementations of the determining unit 702, refer to related descriptions of S307 in the embodiment shown in FIG. 3A and FIG. 3B.

In a specific implementation, the determining unit 702 is specifically configured to: if determining, based on the home identifier and the correspondence between the home identifier and the gateway user plane device, that the gateway user plane device corresponding to the home identifier does not exist, determine a first target user plane device based on service level agreement SLA information of the first user equipment and/or load of each gateway user plane device.

In a specific implementation, the apparatus further includes a storage unit (not shown in the figure).

The storage unit is specifically configured to store a correspondence between the home identifier and the first target user plane device.

In a specific implementation, the sending unit 703 is further configured to send configuration information to a steering device, where the configuration information includes the identifier of the first target gateway user plane device and user information of the first user equipment, and the configuration information indicates the steering device to configure user information of the first user equipment on an interface corresponding to the first target gateway user plane device.

In a specific implementation, when the first user equipment needs to be migrated, the determining unit 702 is further configured to determine, based on the home identifier, one or more second user equipments that need to be migrated, where the one or more second user equipments belong to a home indicated by the home identifier. For specific implementations of the determining unit 702, refer to related descriptions of S402 in the embodiment shown in FIG. 4.

The determining unit 702 is further configured to determine a second target user plane device. For specific implementations of the determining unit 702, refer to related descriptions of S403 in the embodiment shown in FIG. 4.

The sending unit 703 is further configured to send control information to the gateway control plane device, where the control information includes an identifier of the first user equipment, identifiers of the one or more second user equipments, and an identifier of the second target user plane device, and the control information indicates the gateway control plane device to send routing entries of the first user equipment and the one or more second user equipments to the second target user plane device. For specific implementations of the sending unit 703, refer to related descriptions of S404 in the embodiment shown in FIG. 4.

In a specific implementation, a device corresponding to the apparatus is a gateway user plane steering function device.

It is to be noted that, for a specific implementation of each unit in this embodiment, refer to related descriptions in FIG. 3A and FIG. 3B or FIG. 4, and details are not described in this embodiment again.

Figure 8:
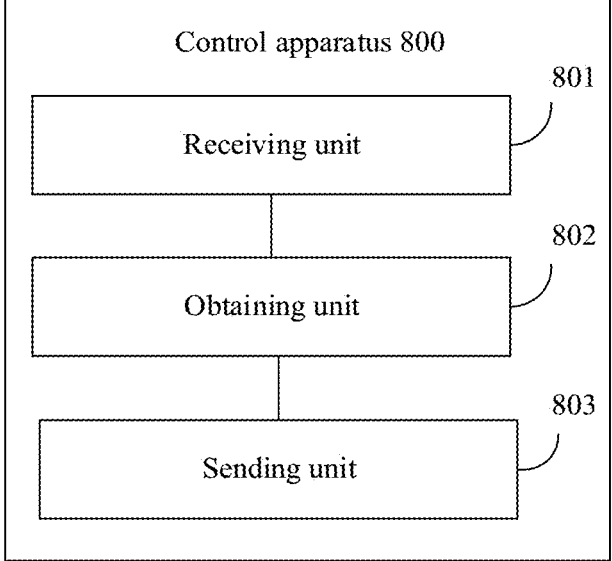
FIG. 8 is a diagram of a structure of another apparatus for controlling user equipment to access a network according to an embodiment of this application.

FIG. 8 shows another apparatus for controlling user equipment to access a network according to an embodiment of this application. The apparatus 800 may implement functions of the gateway control plane device in the foregoing method embodiments. The apparatus includes a receiving unit 801, an obtaining unit 802, and a sending unit 803.

The receiving unit 801 is configured to receive a request packet sent by a first gateway user plane device, where the request packet is used to request first user equipment to access a network, and the request packet includes user information of the first user equipment. For specific implementations of the receiving unit 801, refer to related descriptions of S304 in the embodiment shown in FIG. 3A and FIG. 3B.

The obtaining unit 802 is configured to obtain, based on the user information, a home identifier corresponding to the first user equipment. For a specific implementation of the obtaining unit 802, refer to related descriptions of S305 in the embodiment shown in FIG. 3A and FIG. 3B.

The sending unit 803 is configured to send a first packet including the home identifier to a control device. For specific implementations of the sending unit 803, refer to related descriptions of S306 in the embodiment shown in FIG. 3A and FIG. 3B.

In a specific implementation, the obtaining unit 802 is specifically configured to obtain, based on location information in the user information, the home identifier corresponding to the first user equipment, where the location information is added by a steering device to the request packet.

In a specific implementation, the location information includes an identifier of the steering device and an interface identifier, and the interface identifier corresponds to the first gateway user plane device.

In a specific implementation, the obtaining unit 802 is specifically configured to allocate the home identifier to the first user equipment based on the user information.

In a specific implementation, the obtaining unit 802 is specifically configured to send a third packet including the user information to an authentication server; and receive a fourth packet that includes the home identifier and that is sent by the authentication server.

It is to be noted that, for an implementation of each unit in this embodiment, refer to related descriptions of the embodiment shown in FIG. 3A and FIG. 3B, and details are not described in this embodiment again.

Figure 9:
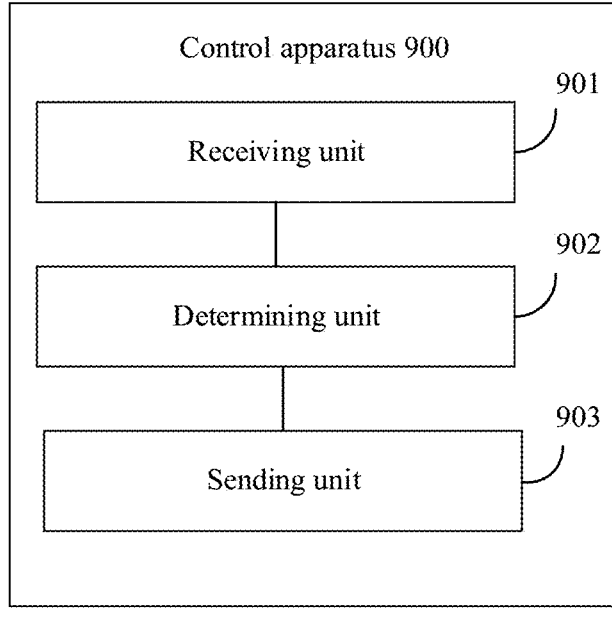
FIG. 9 is a diagram of a structure of still another apparatus for controlling user equipment to access a network according to an embodiment of this application.

FIG. 9 shows still another apparatus for controlling user equipment to access a network according to an embodiment of this application. The apparatus 900 may implement functions of the steering device in the foregoing method embodiments. The apparatus includes a receiving unit 901, a determining unit 902, and a sending unit 903.

The receiving unit 901 is configured to receive a request packet sent by a first gateway user plane device, where the request packet is used to request first user equipment to access a network, the request packet includes location information, and the request packet is broadcast to a plurality of gateway user plane devices.

The determining unit 902 is configured to determine a home identifier based on the location information.

The determining unit 902 is further configured to determine a first target gateway user plane device based on the home identifier.

The sending unit 903 is configured to send a fifth packet to the first target gateway user plane device, where the fifth packet includes the first target gateway user plane device.

In a possible implementation, the determining unit 902 is specifically configured to determine, based on the home identifier and a correspondence between the home identifier and a gateway user plane device, that the gateway user plane device corresponding to the home identifier exists; and determine the gateway user plane device corresponding to the home identifier as the first target gateway user plane device.

In a possible implementation, the determining unit 902 is specifically further configured to: if determining, based on the home identifier and the correspondence between the home identifier and the gateway user plane device, that the gateway user plane device corresponding to the home identifier does not exist, determine a first target user plane device based on service level agreement SLA information of the first user equipment and/or load of each gateway user plane device.

In a possible implementation, the request packet is broadcast to a plurality of gateway user plane devices.

It is to be noted that, for an implementation of each unit in this embodiment, refer to related descriptions of the embodiment shown in FIG. 6 in the foregoing method embodiments, and details are not described in this embodiment again.

Figure 10:
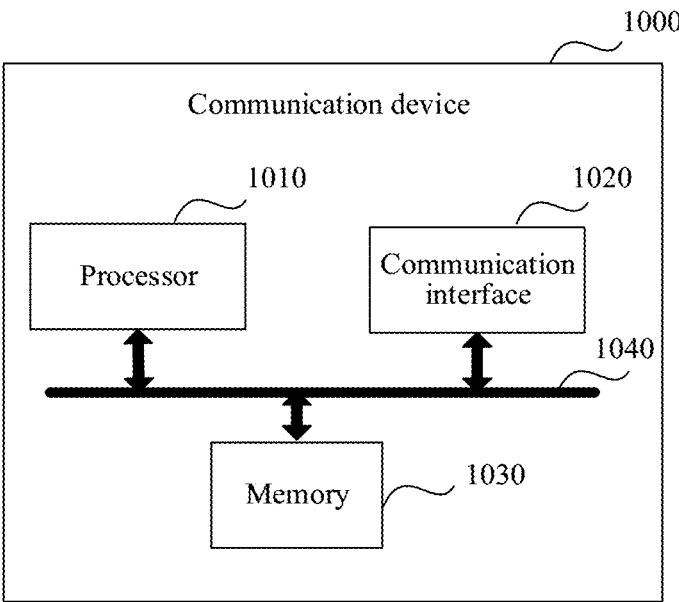
FIG. 10 is a diagram of a structure of a communication device according to an embodiment of this application.

FIG. 10 is a schematic diagram of a structure of a communication device according to an embodiment of this application. The communication device may be, for example, a control device, a gateway control plane device, a gateway user plane device, or a steering device in the method embodiments, or may be implemented by the apparatus 700 in the embodiment shown in FIG. 7, the apparatus 800 in the embodiment shown in FIG. 8, or the apparatus 900 in the embodiment shown in FIG. 9.

Refer to FIG. 10. A communication device woo includes at least a processor low. The communication device woo may further include a communication interface 1020 and a memory 1030. There may be one or more processors 1010 in the communication device woo. In FIG. 10, one processor is used as an example. In this embodiment of this application, the processor low, the communication interface 1020, and the memory 1030 may be connected through a bus system or in another manner. In FIG. 10, an example in which the processor low, the communication interface 1020, and the memory 1030 are connected through a bus system 1040 is used.

The processor low may be a CPU, an NP, or a combination of a CPU and an NP. The processor low may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

When the communication device is a steering device, the processor 1010 may perform related functions such as adding location information to the request packet in the foregoing method examples. When the communication device is a gateway user plane device, the processor low may perform related functions such as obtaining, based on the user information, a home identifier corresponding to the first user equipment in the foregoing method embodiments.

The communication interface 1020 is configured to receive and send a packet. Specifically, the communication interface 1020 may include a receiving interface and a sending interface. The receiving interface may be configured to receive a packet, and the sending interface may be configured to send a packet. There may be one or more communication interfaces 1020.

The memory 1030 may include a volatile memory, for example, a random-access memory (RAM). The memory 1030 may further include a non-volatile memory, for example, a flash memory, a hard disk drive (HDD), or a solid-state drive (SSD). The memory 1030 may further include a combination of the foregoing types of memories.

Optionally, the memory 1030 stores an operating system and a program, an executable module or a data structure, or a subset thereof, or an extended set thereof, where the program may include various operation instructions, to implement various operations. The operating system may include various system programs, to implement various basic services and process a hardware-based task. The processor 1010 may read the program in the memory 1030, to implement the method for controlling user equipment to access a network provided in embodiments of this application.

The memory 1030 may be a storage device in the communication device 1000, or may be a storage apparatus independent of the communication device 1000.

The bus system 1040 may be a peripheral component interconnect (PCI) bus, an extended industry standard architecture (EISA) bus, or the like. The bus system 1040 may be classified into an address bus, a data bus, a control bus, and the like. For ease of representation, only one thick line is for representing the bus in FIG. 10, but this does not mean that there is only one bus or only one type of bus.

Figure 11:
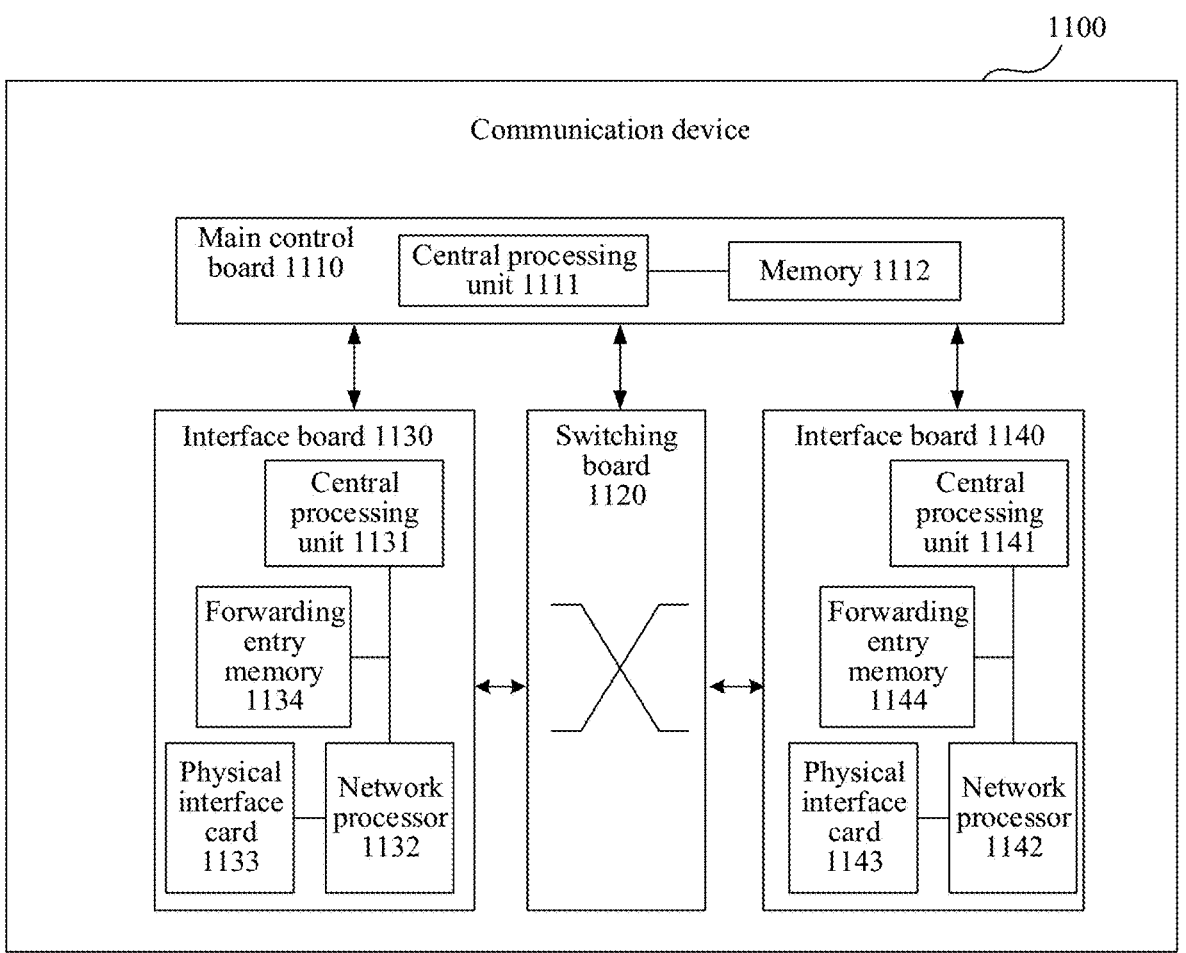
FIG. 11 is a diagram of a structure of another communication device according to an embodiment of this application.

FIG. 11 is a schematic diagram of a structure of another communication device 1100 according to an embodiment of this application. The communication device may be, for example, a control device, a gateway control plane device, a gateway user plane device, or a steering device in the method embodiments, or may be implemented by the apparatus 700 in the embodiment shown in FIG. 7, the apparatus 800 in the embodiment shown in FIG. 8, or the apparatus 900 in the embodiment shown in FIG. 9.

The communication device 1100 includes a main control board mo and an interface board 1130.

The main control board 1110 is also referred to as a main processing unit (MPU) or a route processing card (route processor card). The main control board 1110 controls and manages components in the network device 1100, including functions of route computation, device management, device maintenance, and protocol processing. The main control board 1110 includes a central processing unit 1111 and a memory 1112.

The interface board 1130 is also referred to as a line processing unit (LPU), a line card, or a service board. The interface board 1130 is configured to provide various service interfaces, and forward a data packet. The service interface includes but is not limited to an Ethernet interface, a POS (Packet over SONET/SDH) interface, and the like. The Ethernet interface is, for example, a flexible Ethernet service interface (FlexE Client). The interface board 1130 includes a central processing unit 1131, a network processor 1132, a forwarding entry memory 1134, and a physical interface card (PIC) 1133.

The central processing unit 1131 on the interface board 1130 is configured to: control and manage the interface board 1130, and communicate with the central processing unit 1111 on the main control board 1110.

The network processor 1132 is configured to implement packet forwarding processing. A form of the network processor 1132 may be a forwarding chip. Specifically, processing on an uplink packet includes processing at a packet ingress interface and forwarding table lookup, and processing on a downlink packet includes forwarding table lookup and the like.

The physical interface card 1133 is configured to implement a physical layer interconnection function. Original traffic enters the interface board 1130 from the physical interface card, and a processed packet is sent from the physical interface card 1133. The physical interface card 1133 includes at least one physical interface. The physical interface is also referred to as a physical port. The physical interface card 1133 corresponds to a FlexE physical interface 204 in the system architecture. The physical interface card 1133 is also referred to as a subcard, may be installed on the interface board 1130, and is responsible for converting an optical/electrical signal into a packet, performing validity check on the packet, and forwarding the packet to the network processor 1132 for processing. In some embodiments, the central processing unit 1131 of the interface board 1103 may also perform a function of the network processor 1132, for example, implement software forwarding based on a general-purpose CPU. Therefore, the network processor 1132 is not required in the physical interface card 1133.

Optionally, the communication device 1100 includes a plurality of interface boards. For example, the communication device 1100 further includes an interface board 1140. The interface board 1140 includes a central processing unit 1141, a network processor 1142, a forwarding entry memory 1144, and a physical interface card 1143.

Optionally, the communication device 1100 further includes a switching board 1120. The switching board 1120 may also be referred to as a switch fabric unit (switch fabric unit, SFU). When the network device has a plurality of interface boards 1130, the switching board 1120 is configured to complete data exchange between the interface boards. For example, the interface board 1130 and the interface board 1140 may communicate with each other through the switching board 1120.

The main control board 1110 is coupled to the interface board 1130. For example, the main control board 1110, the interface board 1130 and the interface board 1140, and the switching board 1120 are connected to a system backboard by using a system bus for interworking. In a possible implementation, an inter-process communication (IPC) channel is established between the main control board 1110 and the interface board 1130, and the main control board 1110 and the interface board 1130 communicate with each other through the IPC channel.

Logically, the communication device 1100 includes a control plane and a forwarding plane. The control plane includes the main control board 1110 and the central processing unit 1131. The forwarding plane includes components used for forwarding, for example, the forwarding entry memory 1134, the physical interface card 1133, and the network processor 1132. The control plane performs functions such as routing, generating a forwarding table, processing signaling and a protocol packet, and configuring and maintaining a device status. The control plane delivers the generated forwarding table to the forwarding plane. On the forwarding plane, the network processor 1132 searches the forwarding table delivered by the control plane to forward a packet received by the physical interface card 1133. The forwarding table delivered by the control plane may be stored in the forwarding entry memory 1134. In some embodiments, the control plane and the forwarding plane may be completely separated, and are not on a same device.

It may be understood that, the sending unit and the receiving unit in each embodiment of FIG. 7 to FIG. 9 may be different physical interface cards. For example, the receiving unit 701 is equivalent to a physical interface card 1133, and the sending unit 703 is equivalent to a physical interface card 1134. The obtaining unit 802 and the like in the apparatus 800 may be equivalent to one or more of the central processing unit 1111, the central processing unit 1131, and the central processing unit 1141 in the communication device 1100.

It may be understood that operations performed on the interface board 1140 are consistent with operations performed on the interface board 1130 in this embodiment of this application. For brevity, details are not described again. It may be understood that the communication device 1100 in this embodiment may correspond to an address request device or address allocation in the foregoing method embodiments. The main control board 1110, the interface board 1130, and/or the interface board 1140 in the communication device 1100 may implement functions and/or various steps implemented by the gateway control plane device, the steering device, and the control device in the foregoing method embodiments. For brevity, details are not described herein again.

It may be understood that, there may be one or more main control boards. When there are a plurality of main control boards, the main control boards may include an active main control board and a standby main control board. There may be one or more interface boards. A stronger data processing capability of the communication device indicates a larger quantity of provided interface boards. There may also be one or more physical interface cards on the interface board. There may be no switching board or one or more switching boards. When there are a plurality of switching boards, load balancing and redundancy backup may be implemented together. In a centralized forwarding architecture, the communication device may not need a switching board, and the interface board undertakes a service data processing function of an entire system. In a distributed forwarding architecture, the communication device may have at least one switching board, and data is exchanged between a plurality of interface boards by using the switching board, to provide a capability of exchanging and processing a large capacity of data. Therefore, a data access and processing capability of the communication device in the distributed architecture is greater than the device in the centralized architecture. Optionally, a form of the communication device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a communication device such as a low-end switch or a router) has a low data exchange and processing capability. A specific architecture that is to be used depends on a specific networking deployment scenario.

In some possible embodiments, the steering device, the gateway control plane device, or the control device may be implemented as a virtualized device. For example, the virtualized device may be a virtual machine (VM) on which a program having a packet sending function is run, and the virtual machine is deployed on a hardware device (for example, a physical server). The virtual machine is a complete software-simulated computer system that has complete hardware system functions and that runs in an entirely isolated environment. The virtual machine may be configured as a steering device, a gateway control plane device, or a control device. For example, the steering device, the gateway control plane device, or the control device may be implemented based on a general-purpose physical server in combination with a network functions virtualization (NFV)

technology. The steering device, the gateway control plane device, or the control device is a virtual host, a virtual router, or a virtual switch. A person skilled in the art may, by reading this application and with reference to the NFV technology, virtualize the steering device, the gateway control plane device, and the control device that have the foregoing functions on a general-purpose physical server, and details are not described herein.

It may be understood that the communication devices in the foregoing various product forms each have any function of the steering device, the gateway control plane device, the gateway user plane device, or the control device in the foregoing method embodiments, and details are not described herein again.

An embodiment of this application further provides a chip, including a processor and an interface circuit. The interface circuit is configured to receive instructions and transmit the instructions to the processor. The processor may be, for example, a specific implementation form of the apparatus 700 shown in FIG. 7, and may be configured to perform the method for controlling user equipment to access a network. The processor is coupled to a memory. The memory is configured to store a program or instructions. When the program or the instructions are executed by the processor, the chip system is enabled to implement the method in any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

An embodiment of this application further provides a computer-readable storage medium, including an instruction or a computer program. When the instruction or the computer program is run on a computer, the computer is enabled to perform the method for controlling user equipment to access a network provided in the foregoing embodiments.

An embodiment of this application further provides a computer program product including an instruction or a computer program. When the computer program product runs on a computer, the computer is enabled to perform the method for controlling user equipment to access a network provided in the foregoing embodiments.

In the specification, claims, and accompanying drawings of this application, the terms "first", "second", "third", "fourth", and so on (if existent) are intended to distinguish between similar objects but do not necessarily indicate a specific order or sequence. It may be understood that the data termed in such a way are interchangeable in proper circumstances so that embodiments of the present invention described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it may be understood that the disclosed system, apparatus, and method may be implemented in other manners. For example, the described apparatus embodiments are merely examples. For example, division into units is merely logical service division and may be another division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, service units in embodiments of this application may be integrated into one processing unit, or each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of this application essentially, or a part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The storage medium includes any medium that can store program code, such as a USB flash drive, a removable hard disk, a read-only memory (ROM), a random access memory (RAM), a magnetic disk, or an optical disc.

A person skilled in the art may be aware that in the foregoing one or more examples, services described in the present invention may be implemented by hardware, software, firmware, or any combination thereof. When the services are implemented by using the software, the services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

The objectives, technical solutions, and beneficial effects of the present invention have been further described in detail in the foregoing specific implementations. It can be understood that the foregoing descriptions are merely specific implementations of the present invention.

The foregoing embodiments are merely intended for describing the technical solutions of this application instead of limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A control device, comprising:
one or more memories configured to store instructions; and
one or more processors coupled to the one or more memories and configured to execute the instructions, wherein execution of the instructions causes the control device to:
obtain a home identifier corresponding to first user equipment and identifying a home;
determine a first target gateway user plane device based on the home identifier; and
send configuration information to a steering device, wherein the configuration information comprises an identifier of the first target gateway user plane device, and the configuration information indicates to the steering device to configure user information of the first user equipment on an interface of the steering device, the interface corresponding to the first target gateway user plane device, the steering device being different and separate from the first target gateway user plane device.

2. The control device according to claim 1, wherein executing the instructions further causes the control device to:
determine, based on the home identifier and a correspondence between at least one home identifier and at least one gateway user plane device, that a gateway user plane device corresponding to the home identifier exists; and
determine the gateway user plane device corresponding to the home identifier as the first target gateway user plane device.

3. The control device according to claim 2, wherein executing the instructions further causes the control device to:
when the control device determines, based on the home identifier and the correspondence between the at least one home identifier and the at least one gateway user plane device, that no gateway user plane device corresponding to the home identifier exists, determine a first target user plane device based on at least one of service level agreement (SLA) information of the first user equipment or load of each gateway user plane device.

4. The control device according to claim 3, wherein executing the instructions further causes the control device to:
store a correspondence between the home identifier and the first target user plane device.

5. The control device according to claim 1, wherein executing the instructions further causes the control device to:
send a second packet to a gateway control plane device, wherein the second packet comprises the identifier of the first target gateway user plane device.

6. The control device according to claim 1, wherein executing the instructions further causes the control device to:
when the first user equipment needs to be migrated, determine, based on the home identifier, one or more second user equipment to be migrated, wherein the one or more second user equipment belong to the home indicated by the home identifier;
determine a second target user plane device; and
send control information to a gateway control plane device, wherein the control information comprises an identifier of the first user equipment, identifiers of the one or more second user equipment, and an identifier of the second target user plane device, and the control information indicates to the gateway control plane device to send routing entries of the first user equipment and the one or more second user equipment to the second target user plane device.

7. The control device according to claim 1, wherein the control device is a gateway user plane steering function device.

8. The control device according to claim 1, wherein executing the instructions further causes the control device to:
receive a first packet sent by a gateway control plane device, wherein the first packet comprises the home identifier corresponding to the first user equipment.

9. The control device according to claim 1, the first target gateway user plane device being a broadband network gateway-user plane (BNG-UP), the steering device being between an access network (AN) device and the BNG-UP.

10. A communication system, comprising:
a control device;
a first gateway user plane device; and
a steering device;
wherein the control device is configured to:
obtain a home identifier corresponding to first user equipment and identifying a home;
determine a first target gateway user plane device based on the home identifier; and
send configuration information to the steering device, wherein the configuration information comprises an identifier of the first target gateway user plane device; and
wherein the steering device is configured to:
receive the configuration information; and
configure user information of the first user equipment on an interface of the steering device, the interface corresponding to the first target gateway user plane device, the steering device being different and separate from the first target gateway user plane device.

11. The communication system according to claim 10, wherein the control device is further configured to:

determine, based on the home identifier and a correspondence between at least one home identifier and at least one gateway user plane device, that a gateway user plane device corresponding to the home identifier exists; and determine the gateway user plane device corresponding to the home identifier as the first target gateway user plane device.

12. The communication system according to claim 11, wherein the control device is further configured to:

when the control device determines, based on the home identifier and the correspondence between the at least one home identifier and the at least one gateway user plane device, that no gateway user plane device corresponding to the home identifier exists, determine a first target user plane device based on at least one of service level agreement (SLA) information of the first user equipment or load of each gateway user plane device.

13. The communication system according to claim 12, wherein the control device is further configured to:

store a correspondence between the home identifier and the first target user plane device.

14. The communication system according to claim 10, wherein the control device is further configured to:

send a second packet to a gateway control plane device, wherein the second packet comprises the identifier of the first target gateway user plane device.

15. The communication system according to claim 10, wherein the control device is further configured to:

when the first user equipment needs to be migrated, determine, based on the home identifier, one or more second user equipment to be migrated, wherein the one or more second user equipment belong to the home indicated by the home identifier;

determine a second target user plane device; and send control information to a gateway control plane device, wherein the control information comprises an identifier of the first user equipment, identifiers of the one or more second user equipment, and an identifier of the second target user plane device, and the control information indicates to the gateway control plane device to send routing entries of the first user equipment and the one or more second user equipment to the second target user plane device.

16. The communication system according to claim 10, wherein the control device is a gateway user plane steering function device.

17. The communication system according to claim 10, wherein the control device is further configured to:

receive a first packet sent by a gateway control plane device, wherein the first packet comprises the home identifier corresponding to the first user equipment.

18. A method, comprising:

obtaining, by a control device, a home identifier corresponding to first user equipment and identifying a home;

determining, by the control device, a first target gateway user plane device based on the home identifier; and sending, by the control device, configuration information to a steering device, wherein the configuration information comprises an identifier of the first target gateway user plane device, and the configuration information indicates to the steering device to configure user information of the first user equipment on an interface of the steering device, the interface corresponding to the first target gateway user plane device, the steering device being different and separate from the first target gateway user plane device.

19. The method according to claim 18, further comprising:

determining, by the control device, based on the home identifier and a correspondence between at least one home identifier and at least one gateway user plane device, that a gateway user plane device corresponding to the home identifier exists; and determining, by the control device, the gateway user plane device corresponding to the home identifier as the first target gateway user plane device.

20. The method according to claim 19, further comprising:

when the control device determines, based on the home identifier and the correspondence between the at least one home identifier and the at least one gateway user plane device, that no gateway user plane device corresponding to the home identifier exists, determining, by the control device, a first target user plane device based on at least one of service level agreement (SLA) information of the first user equipment or load of each gateway user plane device.

21. The method according to claim 20, further comprising:

storing, by the control device, a correspondence between the home identifier and the first target user plane device.

* * * * *